United States Patent
Ueda et al.

(10) Patent No.: US 9,452,677 B2
(45) Date of Patent: Sep. 27, 2016

(54) DISPLAY CONTROL APPARATUS

(71) Applicant: DENSO CORPORATION, Kariya, Aichi-pref. (JP)

(72) Inventors: Yoshihiro Ueda, Kariya (JP); Shigeo Katoh, Kariya (JP); Hitoshi Sugiyama, Anjo (JP)

(73) Assignee: DENSO CORPORATION, Kariya (JP)

( * ) Notice: Subject to any disclaimer, the term of this patent is extended or adjusted under 35 U.S.C. 154(b) by 150 days.

(21) Appl. No.: 14/353,154

(22) PCT Filed: Oct. 23, 2012

(86) PCT No.: PCT/JP2012/006775
§ 371 (c)(1),
(2) Date: Apr. 21, 2014

(87) PCT Pub. No.: WO2013/061576
PCT Pub. Date: May 2, 2013

(65) Prior Publication Data
US 2014/0327533 A1    Nov. 6, 2014

(30) Foreign Application Priority Data

Oct. 24, 2011   (JP) ................................. 2011-232987
Aug. 28, 2012   (JP) ................................. 2012-187563
Oct. 18, 2012   (JP) ................................. 2012-230960

(51) Int. Cl.
*B60Q 1/00*    (2006.01)
*B60K 35/00*   (2006.01)
*G07C 5/00*    (2006.01)

(52) U.S. Cl.
CPC ............... *B60K 35/00* (2013.01); *G07C 5/004* (2013.01); *B60K 2350/1096* (2013.01); *B60K 2350/352* (2013.01)

(58) Field of Classification Search
CPC .............................. B60K 35/00; G07C 5/004
USPC .......................................... 340/438
See application file for complete search history.

(56) References Cited

U.S. PATENT DOCUMENTS 5,757,268 A   5/1998   Toffolo et al.
6,710,789 B1  3/2004   Sekiguchi et al.
(Continued)

FOREIGN PATENT DOCUMENTS

JP    10-287188 A    10/1998
JP    10-297319 A    11/1998
(Continued)

OTHER PUBLICATIONS

Office Action mailed May 12, 2015 issued in corresponding JP patent application No. 2012-271465 (and English translation).
(Continued)

*Primary Examiner* — Kerri McNally
(74) *Attorney, Agent, or Firm* — Posz Law Group, PLC

(57) ABSTRACT

A display control apparatus for assigning a content to an area of a screen of an in-vehicle display and for displaying the content is disclosed. When a display Instruction to display a new content different from a present content to an area is generated during displaying of the present content on the area, the display control apparatus selects either one of the present content and the new content as a display target of the area based on an importance degree of the new content and an importance degree of the present content.

29 Claims, 19 Drawing Sheets

(56) References Cited

U.S. PATENT DOCUMENTS

| | | | |
|---|---|---|---|
| 7,065,712 | B2 | 6/2006 | Muto et al. |
| 7,136,749 | B2 | 11/2006 | Ichihara et al. |
| 8,548,677 | B2 | 10/2013 | Sugiyama et al. |
| 8,619,092 | B2 | 12/2013 | Yamauchi |
| 2002/0100058 | A1 | 7/2002 | Hirose et al. |
| 2003/0086619 | A1 | 5/2003 | Nagaishi |
| 2005/0179711 | A1 | 8/2005 | Yoshida |
| 2005/0281540 | A1* | 12/2005 | Inokuchi .......... G11B 20/00086 386/232 |
| 2005/0284984 | A1 | 12/2005 | De Lauzun et al. |
| 2007/0113175 | A1 | 5/2007 | Iwasaki |
| 2008/0040474 | A1* | 2/2008 | Zuckerberg ............ G06Q 30/02 709/224 |
| 2008/0211654 | A1 | 9/2008 | Kasamatsu |
| 2008/0250027 | A1 | 10/2008 | Hirose et al. |
| 2009/0115592 | A1 | 5/2009 | Miake et al. |
| 2009/0292458 | A1* | 11/2009 | Nakamura ............ G01C 21/32 701/532 |
| 2010/0117810 | A1 | 5/2010 | Hagiwara et al. |
| 2010/0164698 | A1 | 7/2010 | Tsubooka et al. |
| 2010/0245071 | A1 | 9/2010 | Fujisawa et al. |
| 2011/0035145 | A1 | 2/2011 | Yamasaki |
| 2012/0215404 | A1 | 8/2012 | Sugiyama et al. |

FOREIGN PATENT DOCUMENTS

| | | |
|---|---|---|
| JP | H11-282834 A | 10/1999 |
| JP | H11-311545 A | 11/1999 |
| JP | 2004-042683 A | 2/2004 |
| JP | 2006-285434 | 10/2006 |
| JP | 2007-145137 A | 6/2007 |
| JP | 2007-299325 A | 11/2007 |
| JP | 2008-301264 A | 12/2008 |
| JP | 2009-223061 A | 10/2009 |
| JP | 2010-015300 A | 1/2010 |
| JP | 2011-055343 A | 3/2011 |
| JP | 2011-141699 A | 7/2011 |
| JP | 2011-193040 | 9/2011 |
| JP | 2011-204023 | 10/2011 |
| JP | 2013-137643 | 7/2013 |
| WO | 2013/061577 A1 | 2/2013 |
| WO | 2013/061576 A1 | 5/2013 |

OTHER PUBLICATIONS

International Search Report and Written Opinion of the International Searching Authority mailed Nov. 13, 2012 for the related international application No. PCT/JP2012/005079 (with English translation).
Written Opinion of the International Preliminary Examining Authority mailed Jun. 25, 2013 for the related international application No. PCT/JP2012/005079 (with English translation).
International Preliminary Examination Report mailed Nov. 26, 2013 in the related international application No. PCT/JP2012/005079 (with English translation).
International Search Report of the International Searching Authority mailed Nov. 13, 2012 for the related international application No. PCT/JP2012/005080 (with English translation).
Written Opinion of the International Searching Authority mailed Nov. 13, 2012 for the related international application No. PCT/JP2012/005080 (with English translation).
Written Reply dated Nov. 13, 2012 for the related international application No. PCT/JP2012/005080 (with English translation).
Written Opinion of the International Preliminary Examination Authority mailed Jun. 25, 2013 for the related international application No. PCT/JP2012/005080 (with English translation).
Reply of PCT/JP2012/005079 to Notification mailed on Nov. 13, 2012 (with English translation).
Amendment of PCT/JP2012/005079 to Notification mailed on Nov. 13, 2012 (with English translation).
International Search Report of the International Searching Authority mailed Nov. 27, 2012 for the corresponding international application No. PCT/JP2012/006775 (with English translation).
Written Opinion of the International Preliminary Examination Authority mailed Nov. 27, 2012 for the corresponding international application No. PCT/JP2012/006775 (with English translation).
International Preliminary Examination Report mailed Sep. 10, 2013 in the corresponding international application No. PCT/JP2012/006775 (with English translation).
Office Action mailed on Nov. 12, 2013 in corresponding JP Application No. 2012-187566 (with English Translation).
Office Action mailed on Dec. 17, 2013 in corresponding JP Application No. 2012-187564 (with English Translation).
Office Action mailed on Nov. 26, 2013 in corresponding JP Application No. 2012-230960 (with English Translation).
Office Action mailed Mar. 12, 2015 in the related U.S. Appl. No. 14/235,187 (US 2014/0152433).
Office Action issued by U.S. Patent Office on Nov. 16, 2015 in connection with related U.S. Appl. No. 14/353,372.
Office Action mailed Jul. 10, 2015 in the related co-pending U.S. Appl. No. 14/127,713.
Office Action mailed Oct. 6, 2015 in the corresponding JP application No. 2012-176322 (with English translation).
U.S. Appl. No. 14/361,737, filed May 30, 2014, Ueda et al.
International Search Report of the International Searching Authority mailed Apr. 9, 2013 in related international application No. PCT/JP2012/008262. (with English translation).
Written Opinion mailed Apr. 9, 2013 in related PCT application No. PCT/JP2012/008262. (with English translation).
Written Reply in PCT/JP2012/005079 received by the JPO on May 8, 2013 (with English translation).
Amendment in PCT/JP2012/005079 received by the JPO on May 8, 2013 (with English translation).
Office Action mailed May 7, 2014 in the related JP application No. 2012-187564 (with English translation).
Office Action mailed Nov. 20, 2015 in the corresponding U.S. Appl. No. 14/361,737.
U.S. Appl. No. 14/235,187, filed Jan. 27, 2014, Sugiyama et al.
U.S. Appl. No. 14/127,713, filed Dec. 19, 2013, Sugiyama et al.
U.S. Appl. No. 14/353,372, filed Apr. 22, 2014, Ueda et al.
International Search Report mailed Nov. 27, 2012 in a related PCT application No. PCT/JP2012/006776 (with English Translation).
Written Opinion mailed Nov. 27, 2012 in a related PCT application No. PCT/JP2012/006776 (with English Translation).
Office Action mailed Feb. 24, 2015 issued in corresponding JP patent application No. 2012-271465 (and English translation).
Office Action mailed on Jan. 27, 2015 in corresponding JP application No. 2012-176322 (with English translation).

* cited by examiner (a)

| NEW-INST GROUP | LAST-COME-WIN |
|---|---|
| 2-B, (8, 5), WAIT, RET | YES ← a |
| 1-A, (--, 6), NO-WAIT, NO-RET | YES ← b |
| 4-C, (--, 4), WAIT, RET | NO ← c |

(b)

| EFF-INST GROUP |
|---|
| 1-X, (9, 8), WAIT, RET ← d |
| 2-Y, (9, 5), NO-WAIT, RET ← e |
| 4-Z, (8, 4), NO-WAIT, RET ← f |
| 3-B, (--, 3), NO-WAIT, NO-RET ← g |

(c) ASSIGNING ORDER ↓

| |
|---|
| 2-B, (<u>8</u>, 5), WAIT, RET ← a |
| 1-X, (9, <u>8</u>), WAIT, RET ← d |
| 1-A, (--, <u>6</u>), NO-WAIT, NO-RET ← b |
| 2-Y, (9, <u>5</u>), NO-WAIT, RET ← e |
| 4-Z, (8, <u>4</u>), NO-WAIT, RET ← f |
| 4-C, (--, <u>4</u>), WAIT, RET ← c |
| 3-B, (--, <u>3</u>), NO-WAIT, NO-RET ← g |

FIG. 7

| ASSIGNABLE | GROUP BEFORE MERGE | WAIT-ABLE | RETURN-ABLE | GROUP AFTER ASSIGN |
|---|---|---|---|---|
| YES | — | — | — | EFF-INST GRP |
| NO | NEW-INST GRP | YES | — | WAIT GRP |
| NO | NEW-INST GRP | NO | — | DELETE |
| NO | EFF-INST GRP | — | YES | RETURN GRP |
| NO | EFF-INST GRP | — | NO | DELETE |

| ASSIGNABLE | GROUP BEFORE ASSIGN | GROUP AFTER ASSIGN |
|---|---|---|
| YES | WAIT GROUP | EFF-INST GROUP |
| | RETURN GROUP | RETURN GROUP |
| NO | WAIT GROUP | WAIT GROUP |
| | RETURN GROUP | RETURN GROUP |

| PRESENT CONTENT \ NEW CONTENT | BACK MONITOR | INCOMING CALL | AUDIO INFO |
|---|---|---|---|
| BACK MONITOR |  | (1) | (2) |
| INCOMING CALL | (3) |  | (4) |
| AUDIO INFO | (5) | (6) |  |

(b)

| CONTENT NAME | AREA NAME | INSERT IMPT DEG | IMPT DEG | WAITABLE | RETURNABLE | LAST-COME-WIN |
|---|---|---|---|---|---|---|
| BACK MONITOR | 1 AREA | -- | 7 | NO | NO | YES |
| INCOMING CALL | 1 AREA | -- | 5 | YES | YES | YES |
| AUDIO INFO | 1 AREA | 8 | 3 | NO | NO | YES |

EX OF "BACK MONITOR" CONTENT DISPLAY (a)

EX OF "INCOMING CALL" CONTENT DISPLAY (b)

EX OF "AUDIO INFO" CONTENT DISPLAY (c)

DISPLAY CONTROL APPARATUS

CROSS-REFERENCE TO RELATED APPLICATIONS

The present application is a U.S. national stage application of International Patent Application No. PCT/JP2012/006775 filed on Oct. 23, 2012.

This application is based on Japanese patent applications No. 2011-232987 filed on Oct. 24, 2011, No. 2012-187563 filed on Aug. 28, 2012, and No. 2012-230960 filed on Oct. 18, 2012, disclosures of which are incorporated herein by reference.

TECHNICAL FIELD

The present disclosure relates to a technology to display vehicle information or the like with a display apparatus provided in a vehicle compartment, so that a user can easily understand the displayed information.

BACKGROUND ART

Information provided in a vehicle compartment is various. For example, the information includes vehicle states such as a vehicle speed, an engine speed, a shift position, fuel, and water temperature. Additionally, the information includes a map for navigation, air conditioner setting information, and audio information, for example. In recent years, the information such as night views for driving assistance, information about a mobile terminal carried into the vehicle, or the like is provided.

Various display apparatuses are mounted to provide these kinds of information. The display apparatuses include a head-up display and a liquid crystal display to display a map for navigation. Some types of meter panels for displaying vehicle speed and the like use liquid crystal displays to provide varieties of information and are categorized as the display apparatuses.

In Patent Document 1, based on an instruction from a user, it is determined which content should be displayed on which area of the display. Specifically, a particular content is fixedly assigned to a predetermined area. Priorities are assigned to areas other than this predetermined area. When a new content is assigned to a certain area having the priority by a user's drag operation for example, the content originally assigned to the certain area is assigned to a different area having a highest priority among the remaining areas. In a similar way, the content originally assigned to the different area is assigned to an area having a highest priority among the remaining areas. Accordingly, a content originally assigned to an area having a lowest priority is deleted.

In a display apparatus for a vehicle, display may switch from car navigation map to audio information and may switch from audio information to a back monitor capturing image or to an incoming call of handsfree phone.

For example, during the display of "map" content for navigation on a display apparatus, a request to display another content such as "audio information", "back monitor", "incoming call information" or the like may be generated.

In this case, in some situations, "late-come-win" (preferentially displaying a later display request) may be preferable. In other situations, "first-come-win" (giving priority to an earlier display request) may be preferable. The content to be displayed varies from situation to situation.

However, Patent Document 1 in principle adopts "late-corn-win" based on the instruction from a user, and thus, situation-adapted display cannot be provided.

In this regard, a method of matrixing of situation-adapted display transitions may be a conceivable method. For example, a management table indicating that when a request to display "back monitor" content is generated during the display of "map" content, the priority is given to "back monitor" content. This kind of management table may determine the "later-come-win" and "first-come-win".

However, as the total number of contents (display screen) is larger, the management table is complicated and its amount of information is huge.

PRIOR ART LITERATURE

Patent Literature

Patent Document 1: Japanese Patent Application Publication No. 2009-140488 (corresponding to US Patent Application Publication No. 20100117810).

SUMMARY OF THE INVENTION

The present invention is made in view of the foregoing. It is an object of the present invention to provide a display control apparatus that, without matrixing the display transitions, can provide a situation-adapted "later-come-win" and a situation-adapted "first-come-win".

According to one example of the present disclosure, a display control apparatus for assigning a content to an area configured as a display region on a screen of a display mounted to a vehicle and for displaying the content is provided. The display control apparatus includes a mediation section and a content assignment section. The mediation section selects either one of a new content and a present content as a display target of the area based on an importance degree of the new content and an importance degree of the present content when a new display instruction to display the new content to the area is generated during displaying of the present content on the area, wherein the new content and the present content are different contents. The content assignment section performs assignment of the new content or the present content as the display target to the area based on a result of the selecting by the mediation section.

According to the above display control apparatus, a situation-adapted "later-come-win" and a situation-adapted "first-come-win" can be implemented without matrixing display transitions.

According to another example of the present disclosure, a display control apparatus for assigning contents to a plurality of areas configured as display regions on a screen of a display mounted to a vehicle and for displaying the contents is provided. The display control apparatus comprises a mediation section and a content assignment section. The mediation section executes mediation between a new instruction and an effective instruction based on an importance degree of the new instruction and an importance degree of the effective instruction. The new instruction is an arrangement instruction to newly arrange a content to an area. The effective instruction is an arrangement instruction presently adopted. The content assignment section selects an arrangement instruction providing no duplication of the contents or the areas based on the mediation between the arrangement instructions by the mediation section, and performs assignment of the contents to the areas.

According the above display control apparatus, when an arrangement instruction to arrange a particular content to a particular area is newly generated, it is possible to arrange the contents while ensuring the consistency with the presently-adopted arrangement instruction.

BRIEF DESCRIPTION OF DRAWINGS

The foregoing and other objects, features and advantages of the disclosure will become more apparent from the detailed description with reference to the accompanying drawings. In the drawings:

FIG. 6(a) is an explanatory diagram illustrating a new-instruction group, and FIG. 6(b) is an explanatory diagram illustrating an effective instruction group, and FIG. 6(c) is an explanatory diagram illustrating assignment and merge between an new-instruction group and an effective instruction group;

FIG. 7 is an explanatory diagram illustrating whether it is assignable or not and illustrating which group is an affiliated group after assignment;

FIG. 11 is an explanatory diagram illustrating whether it is assignable or not and which is an affiliated group after assignment;

FIG. 12(a) is an explanatory diagram illustrating "first-come-win" and "later-come-win" mediation in various cases, and FIG. 12(b) is an explanatory diagram illustrating an arrangement instruction of each content;

MODE FOR CARRYING OUT THE INVENTION

Embodiments will be described with reference to the drawings.

Figure 1:
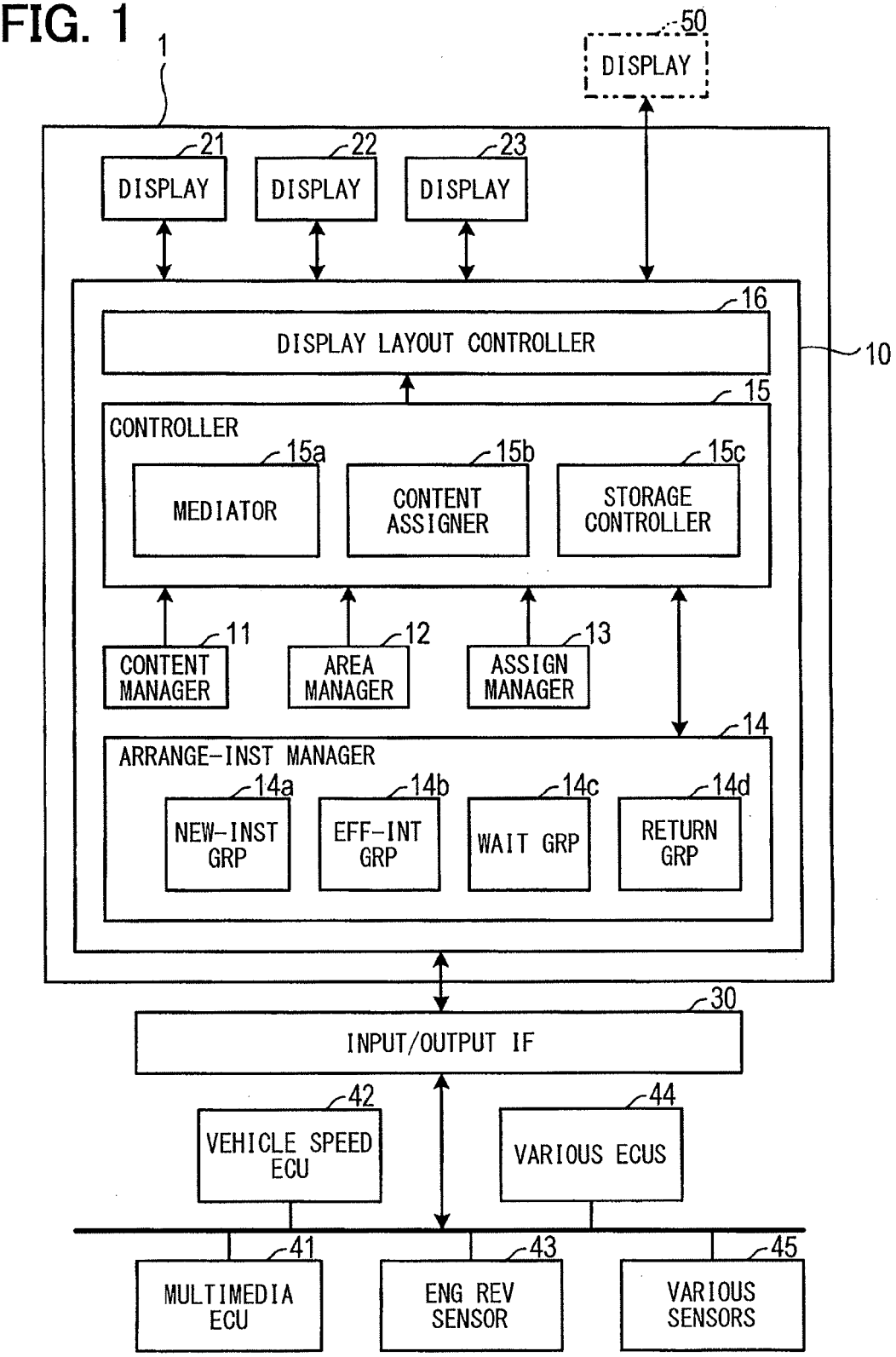
FIG. 1 is a block diagram schematically illustrating a configuration of a display control apparatus.

FIG. 1 is a block diagram schematically illustrating a configuration of a display control apparatus 1 according to an embodiment.

The display control apparatus 1 includes a controller 10 as a major component. The controller 10 connects with three displays 21, 22, and 23, and an input/output IF 30. For the purpose of distinction, the three displays 21 to 23 may be termed "first display apparatus 21," "second display apparatus 22," and "third display apparatus 23" as needed in the description below. The display apparatuses 21, 22, 23 may be included in or external with respect to the display control apparatus 1.

The three display apparatuses 21 to 23 are respectively embodied as a head-up display, a meter panel, and a color liquid crystal display apparatus displaying maps for navigation, for example. However, the display apparatuses are not limited thereto.

The input/output IF 30 enables connection to an in-vehicle network (e.g., CAN). Via the input/output IF 30, the display control apparatus 1 is connected to a multimedia ECU 41, a vehicle speed ECU 42, an engine speed sensor 43, various ECUs 44, and various sensors 45. The various ECUs 44 include, for example, a navigation ECU, a hybrid ECU or the like. The various sensors 45 include an outside air temperature sensor to detect the temperature outside the vehicle compartment and a water temperature sensor to detect the coolant temperature.

This configuration enables the display control apparatus 1 to acquire via the network various contents that are based on various kinds of information. The various contents are directed to "audio information" acquired from the multimedia ECU 41, "vehicle speed" acquired from the vehicle speed ECU 42, "engine speed" acquired from the engine speed sensor 43, "map" and "travel assistance information" acquired from the navigation ECU included in the various ECUs 44, "energy flow information" acquired from the hybrid ECU, and "outside air temperature" acquired from the outside air temperature sensor included in the various sensors 45.

The controller I/O is configured as, for example, a microcomputer with a CPU, a ROM, a RAM, I/O, a bus line connecting these components, and the like. The controller 10 includes a content management section 11, an area management section 12, an assignment management section 13, an arrangement instruction management section 14, a control section 15, and a display layout control section 16. The control section 15 includes or acts as a mediation section 15a (corresponding to mediation means), a content assignment section 15b (corresponding to content assignment means), and a storage control section 15c (corresponding to storage control means).

Figure 2:
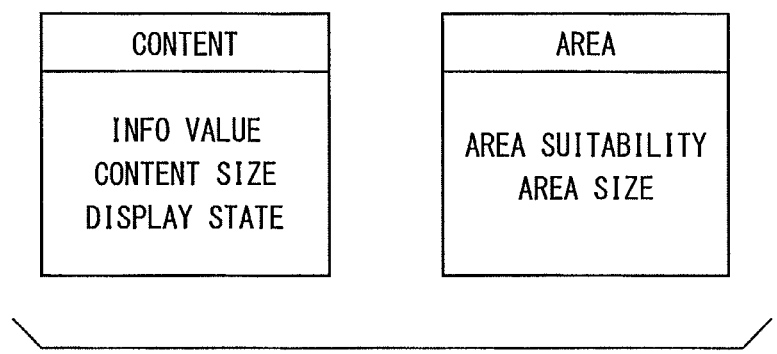
FIG. 2 is an explanatory diagram illustrating attributes associated with contents and areas.

The content management section 11 manages the above-described various contents including those belonging to different categories. The content management section 11 manages a content in association with three attributes such as "information value," "content size," and "display state" as illustrated in FIG. 2.

The information value denotes the value of a content for each target viewer. According to the present embodiment, target viewers include a driver, a front-seat passenger, and a rear-seat passenger. That is, the content value depends on target viewers. For example, contents such as "vehicle speed" and "engine speed" are of high value of information for the driver. Therefore, each content has three types of value, information value (driver), information value (front-seat passenger), and information value (rear-seat passenger). The embodiment assumes that the information value is stored as a numeric value of "0" or larger.

The content size concerns size of an area needed to display a content. The content size is represented as the number of vertical and horizontal pixels, for example.

The display state is flag information indicating whether the content is a display target or not. The display state is set to be "active state" Indicating that the content is a display target or "inactive state" indicating that the content is not a display target.

Specifically, each content switches between "activate state" and "inactivate state" depending on vehicle situations or user's operations. For example, when the gear shift range is R, the content for "back monitor" based on information captured by a rear view camera is in "active state". When the gear shift range is other than "R", the content for "back monitor" is in "inactive state". For example, when a user turns on an audio switch, the content for "audio information" is put in the "activate state". When a user turns off the audio switch, the content for "audio information" is put in "inactive state".

Explanation returns to FIG. 1. The area management section 12 has a function for managing multiple areas as display regions. The areas according to the embodiment are provided in screens of the three display apparatuses 21 to 23. The area information management section 12 similarly manages the areas of the three display apparatuses 21 through 23. The area management section 12 equally manages areas of the display apparatus 21 and those of the display apparatus 22. As illustrated in FIG. 2, the area management section 12 manages an area in association with two attributes, which are "area suitability" and "area size".

The area suitability is used as an index indicating viewability for each target viewer. As described above, target viewers include a driver, a front-seat passenger, and a rear-seat passenger. That is, the area suitability varies from target viewer to target viewer. For example, areas in a meter panel have the large area suitability for the driver. Areas in a liquid crystal display apparatus for displaying maps for navigation have the large area suitability for the driver and the front-seat passenger. Each area has three suitabilities, which are area suitability (driver), area suitability (front-seat passenger), and area suitability (rear-seat passenger). In the present embodiment, the area suitability has ten grades "1" through "10" but is not limited thereto.

The area size concerns size of an area. Similarly to the content size, the area size is represented as the number of vertical and horizontal pixels, for example.

Figure 3:
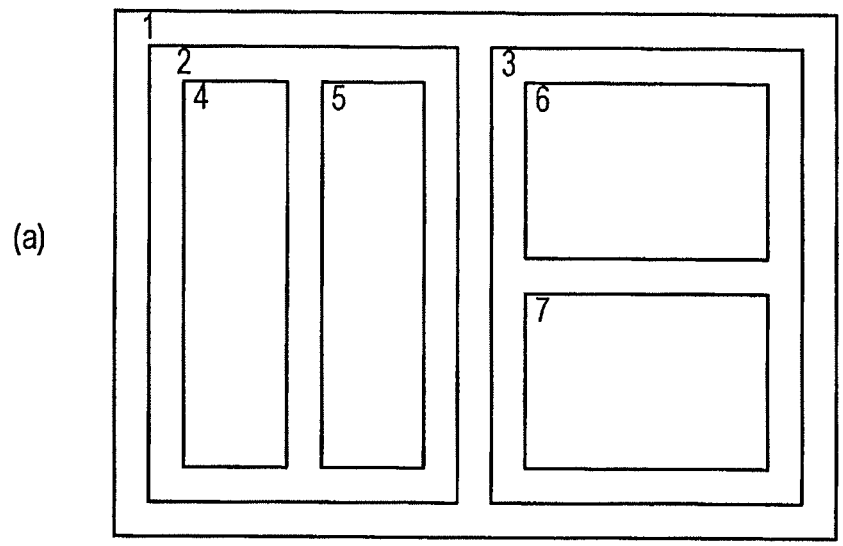
FIGS. 3(a), 3(b) and 3(c) are explanatory diagrams illustrating a hierarchy data structure of areas in an area management section.
Figure 3:
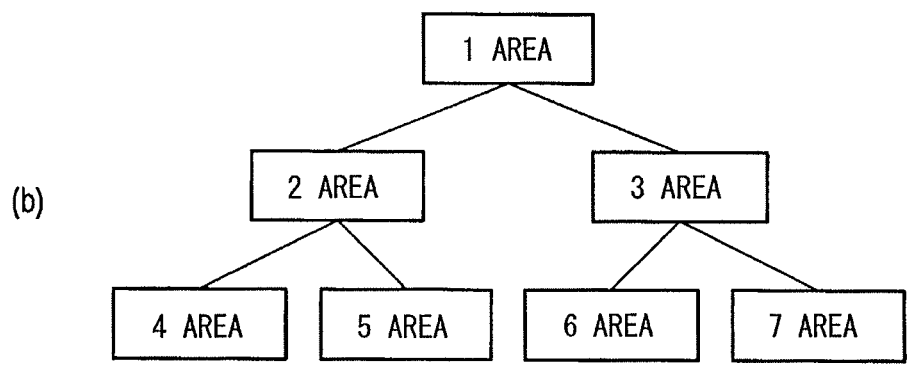
Figure 3:
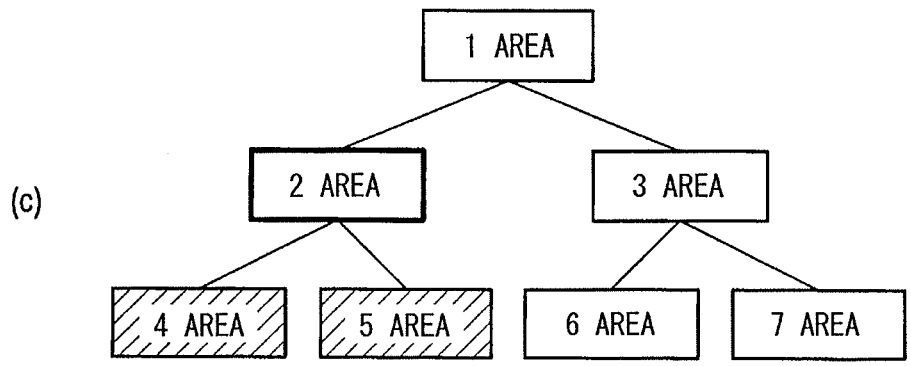

The area management section 12 manages areas as hierarchical data structure, wherein the areas are configured in the first, second and third display apparatuses 21 through 23. For example, the areas for the display apparatus 21 are illustrated in FIG. 3.

As illustrated in FIG. 3(a), the display regions of the display apparatus 21 is configured as: an area 1, which uses a whole screen; an area 2 and an area 3, which are horizontally-divided two areas of the area 1; an area 4 and an area 5, which are horizontally-divided two areas of the area 3; and an area 6 and an area 7, which are vertically-divided two areas of the area 3.

As illustrated in FIG. 3(b), the area 1 is managed as an area belonging to the highest hierarchy. The areas 2 and 3 are managed in a hierarchy immediately below area 1. The areas 4 and 5 are managed in a hierarchy immediately below area 2. The areas 6 and 7 are managed in a hierarchy immediately below area 3.

For example, when a content is assigned to the area 2 as illustrated in FIG. 3(c), it is determined that the areas 4 and 5 belonging to the lower hierarchy are unavailable. When a content is assigned to only area 2, which is one of areas 2 and 3 immediately below area 1 (when areas 3, 6, and 7 are not used), it is sufficient to display the content on an inside of the area 1. For example, the content may be centered over areas 2 and 3.

Explanation returns to FIG. 1. The assignment management section 13 stores assignment information for assigning a specified content to a specified area. The assignment information for assigning a specified content to a specified area indicates a correspondence relation between a predetermined area and a predetermined content.

The arrangement instruction management section 14 manages an arrangement instruction which is provided by a system and an arrangement instruction which is based on an operation from a user. These arrangement instructions are dynamical and thus different than the assignment information stored in the assignment management section 13.

For example, when the gear shift range is put in "R, an instruction to arrange the content "back monitor" in the area displaying the navigation map is issued as an arrangement instruction provided by a system. When a user turns on an audio switch, an instruction to arrange the content "audio information" in the area displaying the navigation map is issued as an arrangement instruction that is based on an operation from a user. The arrangement instructions based on user's operations include an instruction to move a displayed image to another area by a drag operation or the like.

Specifically, an arrangement instruction arranges a specific content to a specific area and mediation between the specific content and a content originally displayed on the specific area is executed. In this situation, a case where the originally displayed content continues is "first-come-win". A case where a new content is arranged in place of the originally displayed content is "later-come-win".

The arrangement instruction management section 14 manages the arrangement instructions by dividing into four groups 14a, 14b, 14c, and 14d. The four groups are a new-instruction group 14a, an effective instruction group 14b, a wait group 14c and a return group 14d.

The new-instruction group 14a is a group containing a new arrangement instruction. To the new-instruction group 14a, a system-based arrangement instruction or a user-operation-based arrangement instruction is added as described above. The arrangement instruction has an area, a content, insertion importance degree, importance degree, return permission-or-prohibition, and wait permission-or-prohibition. An arrangement instruction in the new-instruction group 14a has a later-come-win information for same-importance degree-case. These are illustrated in FIG. 6(a).

A content is assigned to an assignment target area. Areas are shown by numerical characters. Contents are shown by capital alphabets. However, it is not necessary to directly describe an area and a content. Information associating an area and a content may suffice. Note that the above numerical characters are irrelevant to those illustrated in FIG. 3.

The insertion importance degree is a degree regarding whether or not a new arrangement instruction should be adopted. The insertion importance degree is mainly used for merging between the new-instruction group 14a and the effective instruction group 14b. The insertion importance degree is also used for adding an arrangement instruction to the new-instruction group 14a. For example, the arrangement instruction based on user's operation has a large insertion importance degree. Note that the insertion importance degree is not configured in some arrangement instructions. For such arrangement instructions, the below-described process based on an importance degree process is performed.

The importance degree is a degree of importance of the arrangement instruction. The importance degree is used in merging between the groups, while the insertion importance degree is mainly used for adding an arrangement instruction to the new instruction group and for merging between the new instruction group and the effective instruction group 14b. Additionally, when an arrangement instruction does not have the insertion importance degree, the importance degree is used in place of the insertion importance degree.

The insertion importance degree and the importance degree are represented by numerical values 1-10. As the numerical value is large, the insertion importance degree and the importance degree are larger. However, this is not limited thereto.

The effective instruction group 14b is group containing the presently-adopted arrangement instruction, as shown in FIG. 6(b). The effective instruction group 14b is updated by mediating between the new arrangement instruction contained in the new-instruction group 14a and the presently-adopted arrangement instruction contained in the effective instruction group 14b. This mediation is performed by merging between the new-instruction group 14a and the effective instruction group 14b based on the importance degrees.

The wait group 14c is a group storing the information indicating that a content of a newly generated arrangement instruction is not displayed. Specifically, the arrangement instruction added to the wait group 14c is the arrangement instruction that is not stored in the effective instruction group 14b because an arrangement instruction in the effective instruction group 14b is adopted (the first-com-win) as a result of the mediation between the new-instruction group 14a and the effective instruction group 14b. The arrangement instruction stored in the wait group 14c is adopted if its area or content becomes not duplicated with those in effective instruction group 14b. An arrangement instruction to be added to the wait group 14c has information "permission of waiting" as the information of the wait permission-or-prohibition. An arrangement instruction having information "prohibition of waiting" is not added to the wait group 14c and is deleted.

The rerun group 14d is a group storing the information on a certain content, which becomes not displayed due to a newly generated arrangement instruction. Specifically, the arrangement instruction added to the return group 14d is the arrangement instruction that is deleted from the effective instruction group 14b due to the adoption of the arrangement instruction in the new instruction group 14a (the later-com-win) as a result of the mediation between the new-instruction group 14a and the effective instruction group 14b. The arrangement instruction stored in the return group 14d is adopted if its area or content becomes not duplicated with those in effective instruction group 14b. An arrangement instruction to be added to the return group 14d has information "permission of returning" as the return permission-or-prohibition information. An arrangement instruction having information "prohibition of returning" is not added to the return group 14d and is deleted.

The later-come-win information for same-importance degree-case is a flag indicating whether "later-come-win" occurs for the case of the same importance degree. When the later-come-win information for same-importance degree-case indicates that "later-come-win" occurs and the importance degree is the same, a new arrangement instruction wins in the mediation.

In the present embodiment, based on the information stored in the content management section 11, the area management section 12, the assignment management section 13 and the arrangement instruction management section 14, the control section 15 first assigns a content to an area based on the arrangement instruction of the arrangement instruction management section 14. Thereafter, as to a content for which no arrangement instruction is present, the control section 15 calculates an evaluation value of the content with respect to an area and assigns the content to the area. Based on the assignment of the contents to the areas by the control section 15, the display layout control section 16 displays the contents.

A display control process performed by the control section 15 will be described based on FIG. 4. In the description below, the information value and the area suitability are collectively referred to as "value". The content size and the area size are collectively referred to as "size" on an as-needed basis.

At S100, a new-instruction process is performed. Now, the new instruction process will be described. The new instruction process will be illustrated in FIG. 5.

At S300, the merge between the new-instruction group 14a and the effective instruction group 14b is executed. The new-instruction group 14a contains a new arrangement instruction. The effective instruction group 14b contains a presently adopted arrangement instruction. These arrangement instructions are merged in accordance with their importance degrees.

FIG. 6(a) illustrates a new-instruction group 14a, in which the arrangement instruction is provided with an area-content correspondence (insertion importance degree, importance degree), wait permission-or-prohibition, and return permission-or-prohibition. The arrangement instruction is further provided with a later-come-win information for same-importance degree-case. In this drawing, the wait permission-or-prohibition is depicted such that the permission of waiting is "WAIT" and the prohibition of waiting is "NO-WAIT". The return permission-or-prohibition is depicted such that the permission of returning is "RET" and the prohibition of returning is "NO-RET". These are the same in the below-description.

Therefore, an arrangement instruction at the top is for assigning a content B to an area 2 and has the insertion importance degree "8", the importance degree "5", the permission of waiting, the permission of returning, and the occurrence of the later-come-win for the same-importance degree-case. An arrangement instruction b at the second from the top is for assigning a content A to an area 1 and has the insertion importance degree "-", the importance degree "6", the prohibition of waiting, the prohibition of returning, and the occurrence of the later-come-win for the same-importance degree-case. An arrangement instruction c at the third is for assigning a content C to an area 4 and has the insertion importance degree "-", the importance degree "4", the prohibition of waiting, the prohibition of returning, and no occurrence of the later-come-win for the same-importance degree-case. The insertion importance degree "-" signifies that the insertion importance degree is not configured. In this case, the importance degree is used as its substitute.

Arrangement instructions are added to the new-instruction group 14a in order of insertion importance degree. Arrangement instructions are added to the new-instruction group 14a in order of importance degree if the insertion importance degree is not configured. Because of this, the arrangement instruction having a larger importance degree is added to a place closer to the top of the new-instruction group 14a.

As shown in FIG. 6(*b*), arrangement instructions d, e, f, g, with similar type of information are stored in the effective instruction group 14b. The arrangement instruction d at the top is for assigning a content X to an area 1 and has the insertion importance degree "9", the importance degree "8", the permission of waiting, and the permission of returning". The arrangement instruction e at the second is for assigning a content Y to an area 2 and has the insertion importance degree "9", the importance degree "5", the prohibition of waiting, and the permission of returning. The arrangement instruction f at the third is for assigning a content Z to an area 4 and has the insertion importance degree "8", the importance degree "4", the prohibition of waiting, and the permission of returning. The arrangement instruction g at the fourth is for assigning a content B to an area 3 and has the insertion importance degree "-", the importance degree "3", the prohibition of waiting, and the prohibition of returning.

In the above illustrated case, the merge between the new-instruction group 14a and the effective instruction group 14b results in FIG. 6(*c*). Because the arrangement instructions a to c belong to the new-instruction group 14a, the arrangement instructions a to c are to be sorted by the insertion importance degree. However, because the insertion importance degree is not configured in the arrangement instructions b, c, the arrangement instructions b, c are sorted by the importance degree. Because the arrangement instructions d to g belong to the effective instruction group 14b, the arrangement instructions d to g are sorted by the importance degree. In the above, because the arrangement instruction a has the same insertion importance degree "8" as the arrangement instruction d, the arrangement instruction a is placed closer to the top based on the later-come-win information for same-importance degree-case. Additionally, because the arrangement instruction f has the same importance degree "4" as the arrangement instruction c, the arrangement instruction f is placed closer the top based on the later-come-win information for same-importance degree-case. The underline of the importance degree signifies that it is used in the merge. The same applies to the following description.

Figure 5:
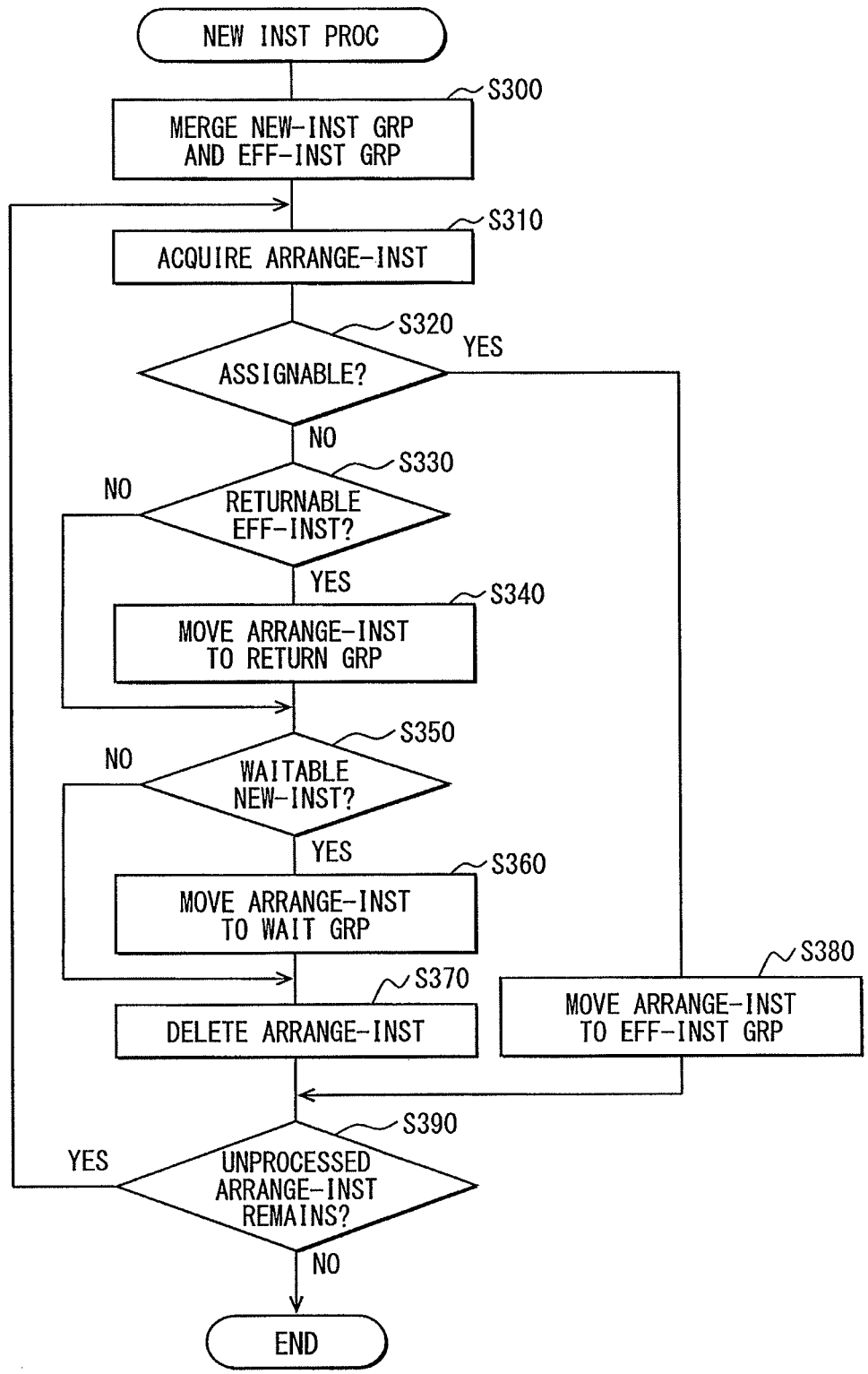
FIG. 5 is a flowchart illustrating a new-instruction process.

Explanation returns to FIG. 5. At S310, one of the merged arrangement instructions is acquired. This process sequentially acquires the arrangement instruction in an order from the top of the merged group illustrated in, for example, FIG. 6(*c*).

At S320, it is determined whether the arrangement instruction is assignable. In FIG. 6(*c*), it is determined that the arrangement instructions a, d, f, which provide no duplication of areas or contents, are assignable. Each arrangement instruction a, d, f is depicted with a thick frame in FIG. 6(*c*). When the arrangement instructions are determined as assignable (S320: YES), a correspondence relationship between the areas and the contents are stored and the arrangement instructions are moved to the effective instruction group 14b at S380. Thereafter, the process proceeds to S390. When the arrangement instructions are determined as not assignable (S320: NO), the process proceeds to S330.

At S330, it is determined whether or not the arrangement instruction is "effective instruction" and "permission of returning". The process determines whether or not the arrangement instruction is the arrangement instruction that was previously contained in the effective instruction group 14b and that has "permission of returning" information. In FIG. 6(*c*), this arrangement instruction is the arrangement instruction e. When it is determined that the arrangement instruction is "effective instruction" and "permission of returning" (S330: YES), the arrangement instruction is moved the return group 14d at S340. Thereafter, the process proceeds to S350. When it is determined that the arrangement instruction is not "effective instruction" or that the arrangement instruction is "prohibition of returning" (S330: NO), the process proceeds to S350 without execution of S340.

At S350, it is determined whether or not the arrangement instruction is "new instruction" and "permission of waiting". The process determines whether or not the arrangement instruction is the arrangement instruction that was previously contained in the new instruction group 14a and that has "permission of waiting" information. In FIG. 6(*c*), the arrangement instruction c corresponds to this. When it is determined that the arrangement instruction is "new instruction" and "permission of waiting" (S350: YES), the arrangement instruction is moved to the wait group 14c at S360. Thereafter, the process proceeds to S370. When it is determined that the arrangement instruction is not "new instruction" or that the arrangement instruction is "prohibition of waiting" (S350: NO), the process proceeds to S370 without execution of S360.

At S370, the arrangement INSTRUCTION that is not assignable is deleted. In this process, the arrangement instruction that is not moved to the return group 14d nor the wait group 14c is deleted.

At S390 after S370 or S380, it is determined whether an unprocessed arrangement instruction remains. When it is determined that an unprocessed arrangement instruction remains (S390: YES), the process repeated from S310. When it is determined that all the arrangement instructions has been processed, (S390: NO), the new-instruction process is ended.

By the new instruction process, the assignment is executed in descending order of importance degree (Insertion importance degree for the case of the new arrangement instruction) (S300, S310 in FIG. 5). In the above, one(s) of the arrangement instructions is deleted and another (other) is moved to a different group.

Figure 8:
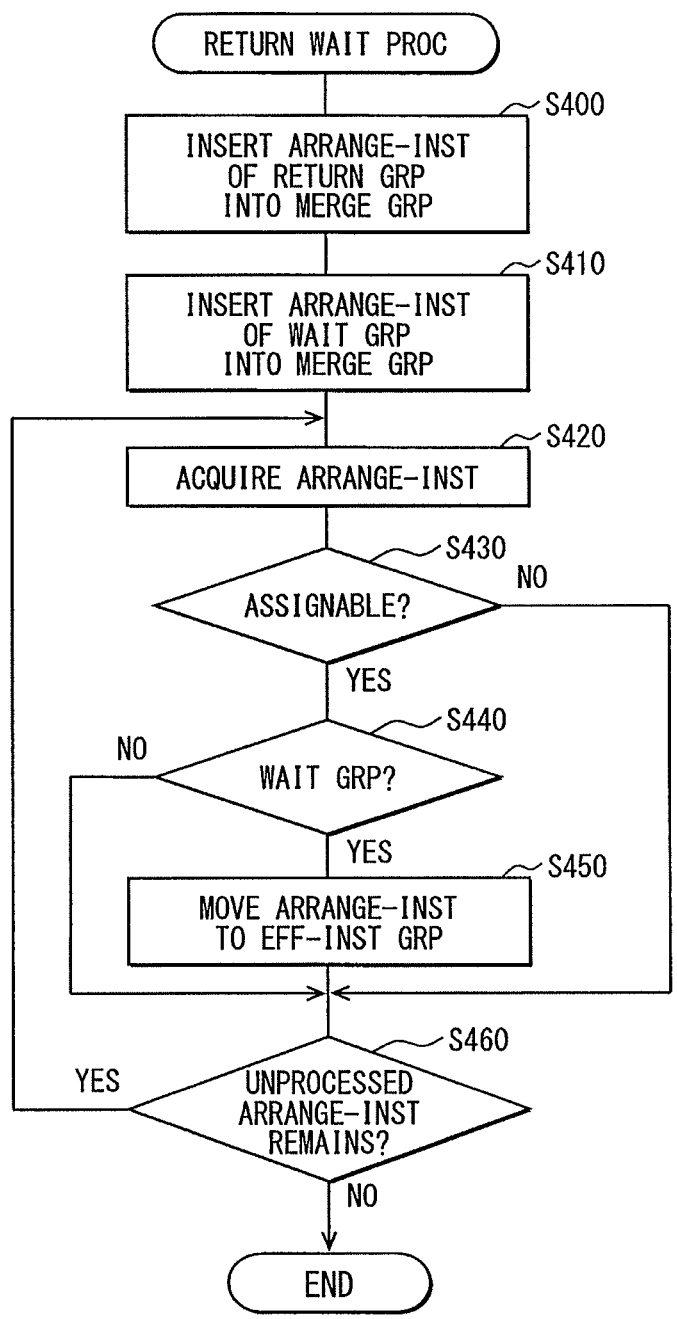
FIG. 8 is a flowchart illustrating a wait-return process.

As shown in FIG. 7, the assignable arrangement instruction is moved to the effective instruction group 14b (S320: YES, S380 in FIG. 5). The arrangement instruction that is not assignable is treated as follows. When the affiliated group before the merge is the new-instruction group 14a and the wait permission-or-prohibition is "permission of waiting" (S350: YES), the arrangement instruction is moved to the wait group 14c (S360). When the affiliated group before the merge is the new-instruction group 14a and the wait permission-or-prohibition is "prohibition of waiting", the arrangement instruction is deleted (S370). When the affiliated group before the merge is the effective instruction group 14b and the return permission-or-prohibition is the permission of returning (S330: YES), the arrangement instruction is moved to the return group 14d (S340). When the affiliated group before the merge is the effective instruction group 14b and the return permission-or-prohibition is the prohibition of returning, the arrangement instruction is deleted (S370). The arrangement instructions are added to the wait group 14c and are placed in a chronological order from the top of the wait group 14c. The arrangement instructions are added to the return group 14d and placed in a reverse chronological order from the top of the return group 14d Explanation returns to FIG. 4. At S110, the wait return process is performed. Now, the wait return process is described. The wait return process is illustrated in FIG. 8.

At S400, the arrangement instructions of the return group 14d are inserted into the merge group. At S410, the arrangement instructions of the wait group 14c are inserted into the merge group. These processes sort the arrangement instructions in the return group 14d and the wait group 14c in an order of importance degree. In the above, an order relationship among the arrangement instructions having no insertion importance degree is unchanged.

Insertion of arrangement instructions of the return group 14d into the merge group will be specifically described.

Figure 9:
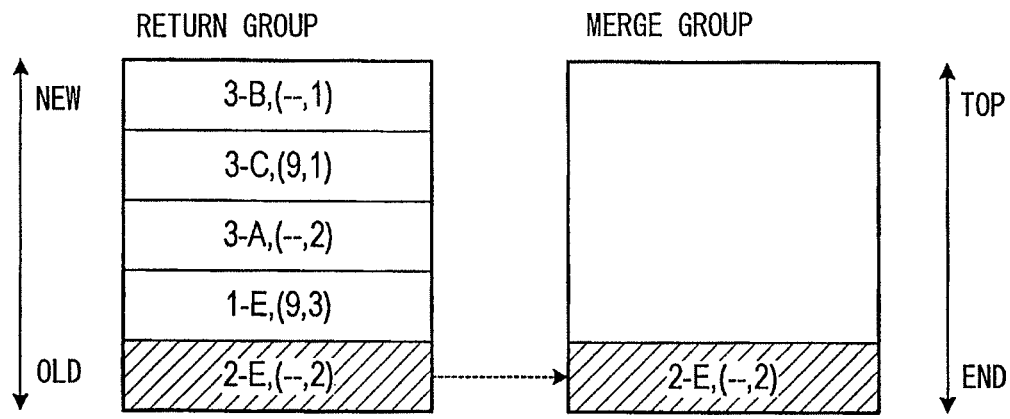
FIG. 9(a), FIG. 9(b) and FIG. 9(c) are explanatory diagrams showing an example of insertion of a return group into a merge group.
Figure 9:
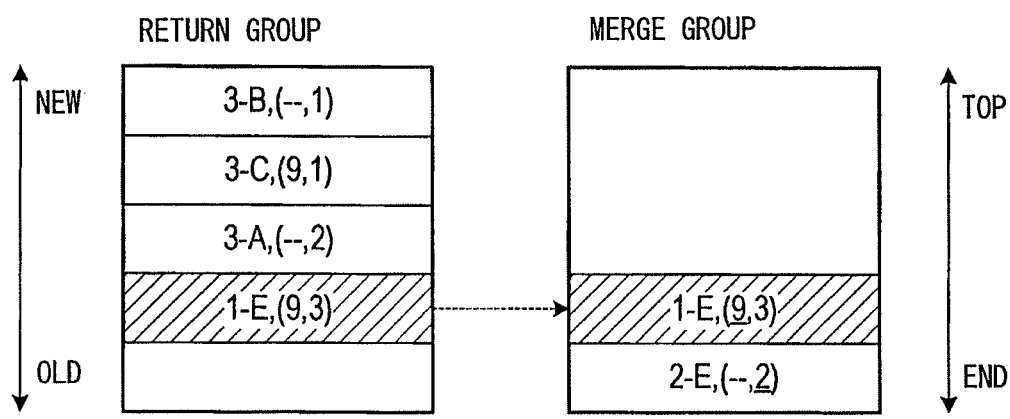
Figure 9:
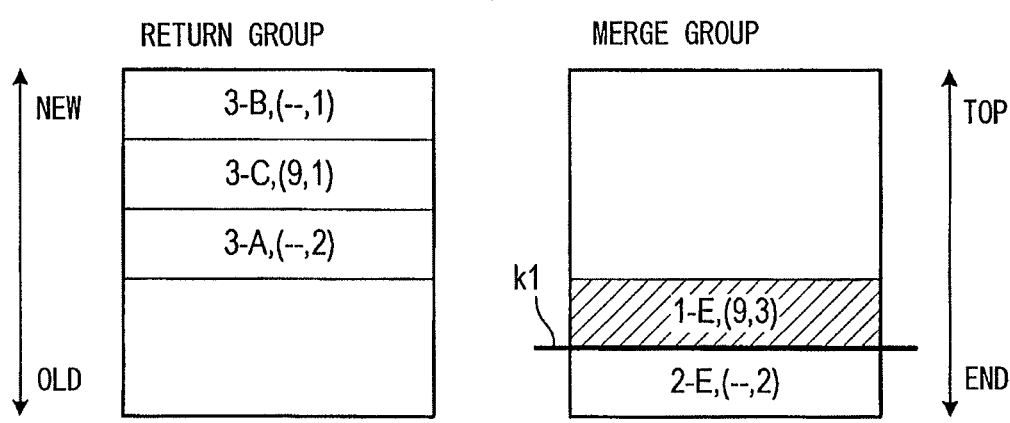

As shown in FIG. 9(a), an arrangement instruction "2-E" at an end of the return group 14d is inserted into the merge group. Because the arrangement instructions in the return group 14d are placed in a reverse chronological order from the top of the return group 14d, the oldest arrangement instruction is inserted to the end of the merge group.

Additionally, as shown in FIG. 9(b), an arrangement instruction "1-E" in the return group 14d is inserted into the merge group. Because the insertion importance degree is configured in the arrangement instruction "1-E", this insertion importance degree is used in the insertion. Because the arrangement instruction "1-E" has the insertion importance degree "9", it is inserted to the top side of the merge group. Additionally, because the arrangement instruction "1-E" has the insertion importance degree "9", a partition line k1 for the area 1 is set as shown in FIG. 9(c).

Figure 10:
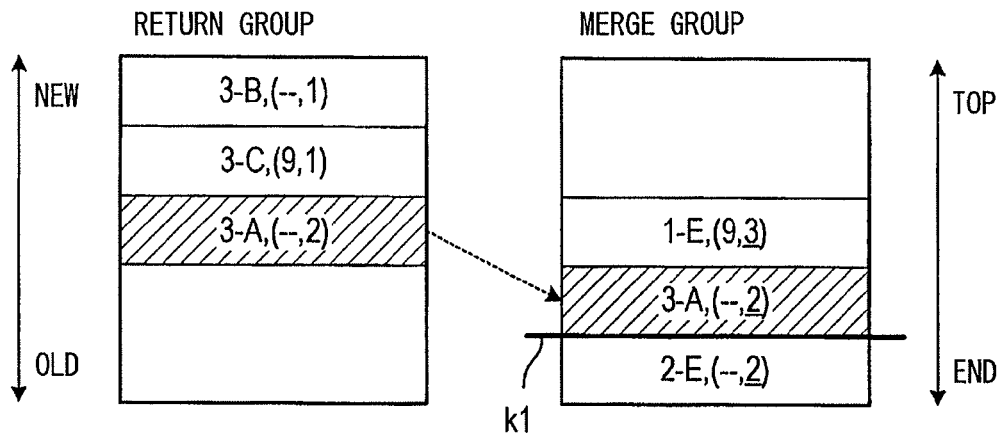
FIG. 10(a), FIG. 10(b) and FIG. 10(c) are explanatory diagrams showing another example of insertion of a return group into a merge group.
Figure 10:
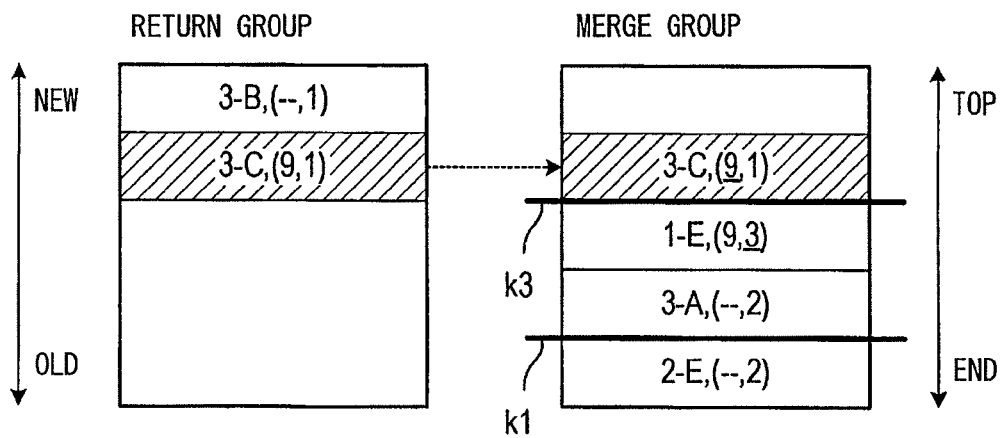
Figure 10:
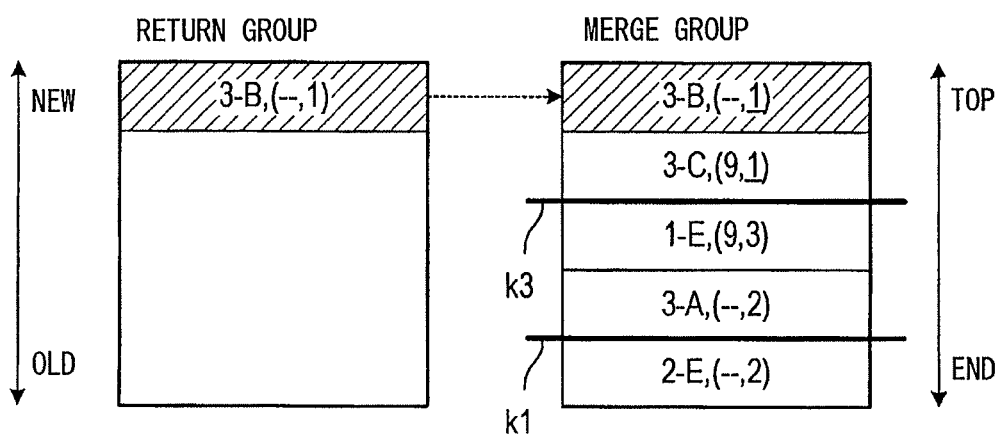

Next, as shown in FIG. 10(a), the arrangement instruction "3-A" is inserted into the merge group. Because a partition line for the area 3 is not present, a search for insertion place is made from the end of the merge group. Based on comparison of importance degrees, the arrangement instruction "3-A" is inserted on the end side relative to the arrangement instruction "1-E". Additionally, the arrangement instruction "3-A" has the same importance degree "2" as the arrangement instruction "2-E", the newer arrangement instruction "3-A" is inserted to the top side relative to the arrangement instruction "2-E". That is, in the case of the same importance degree, a newer arrangement instruction is inserted to a place closer to the top.

Subsequently, as shown in FIG. 10(b), an arrangement instruction "3-C" in the return group 14d is inserted into the merge group. Because the insertion importance degree is configured in the arrangement instruction "3-C", this insertion importance degree is used in the insertion. Because the arrangement instruction "3-C" has the insertion importance degree "9", it is inserted at place closest to the top of the merge group. Additionally, the arrangement instruction "3-C" is provided with the insertion importance degree, a partition line k3 for the area 3 is set.

At last, as shown in FIG. 10(c), the arrangement instruction "3-B" of the return group 14d is inserted into the merge group. In the above, the partition line k3 for the area 3 is set, a search for insertion place on a top side of the partition line k3 is made. Because the arrangement instruction "3-B" has the same importance degree "1" as the arrangement instruction "3-C", the newer arrangement instruction "3-B" is inserted closer to top of the merge group.

The arrangement instruction of the return group 14d is inserted into the return group in a manner as described in the above concrete example. In a similar way, the arrangement instruction of the wait group 14c is inserted into the return group. As described above, because the arrangement instructions in the wait group 14c are placed in a chronological order from the top of the wait group 14c, the arrangement instructions are inserted into the merge group in an order from the newest arranged instruction at the end of the wait group 14c. In the insertion of the arrangement instruction of the wait group 14c, when the importance degree is the same, the older arrangement instruction is inserted to a place closer to the top of the merge group. When the arrangement instruction of the wait group 14c has the same importance degree as the arrangement instruction of the return group 14d, the arrangement instruction of the wait group 14c is preferentially is inserted to a place close to the top of the merge group, so the priority is given to the arrangement instruction of the wait group 14c.

Explanation returns to FIG. 8. At S420, one of the arrangement instructions of the merge group is acquired. This process sequentially retrieves the arrangement instruction in an order from the top of the merge group.

At S430, it is determined whether the arrangement instruction is assignable. This process determines whether or not the arrangement instruction retrieved at S420 has duplication with the arrangement instruction in the effective instruction group 14b. When it is determined that the arrangement instruction is assignable (S430: YES), an area-content correspondence relationship is stored, and the process proceeds to S440. When it is determined that the arrangement instruction is not assignable (S430: NO), the process proceeds to S460.

At S440, it is determined whether the arrangement instruction selected at S420 is the arrangement instruction that was in the wait group 14c. When it is determined that the selected arrangement instruction was in the wait group 14c (S440: YES), the arrangement instruction is moved to the effective instruction group 14b at S450, and then, the process proceeds to S460. When it is determined that the selected arrangement instruction was not in the wait group 14c (S440: NO), the process proceeds to S460 without execution of S450.

At S460, it is determined whether or not an unprocessed arrangement instruction remains in the merge group. When it is determined that an unprocessed arrangement instruction remains (S460: YES), the process repeats from S420. When it is determined that all of the arrangement instructions in the merge group are already processed (S460: NO), the wait return process is ended.

In the wait return process, after the merge group is generated (S400, S410 in FIG. 8), the correspondence relationship between the area and the content of the arrangement instruction determined as assignable is stored. When the above arrangement instruction was originally contained in the wait group 14c (S440: YES), this arrangement instruction is added to the effective instruction group 14b (S450). Otherwise, the arrangement instruction is not moved. This is illustrated in FIG. 11.

Figure 4:
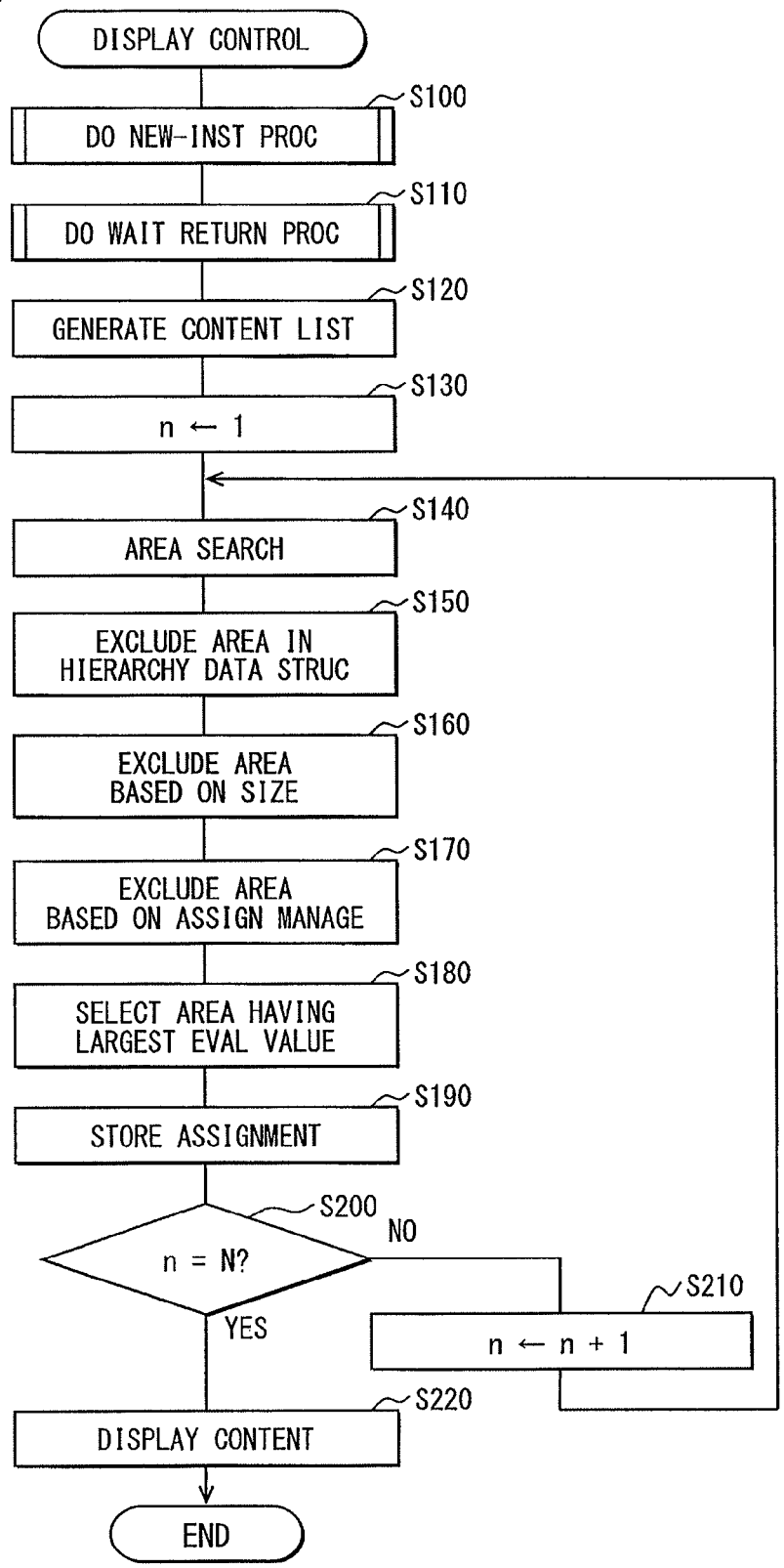
FIG. 4 is a flowchart illustrating a display control process.

Explanation returns to FIG. 4. At S120, a content list is generated. This process generates a list of contents that are not assigned to areas in the process S100 and S110. Specifically, the contents having "active state" as their attributes are extracted and sorted in a descending order of information value. For example, suppose that contents X, Y, Z, and W are present and the information value is X>Y>Z>W. In this case, when the contents X Z, W are in the active state, the content list "X→Z→W" is generated. Now, it is assumed here that the total number of sorted contents is N.

At subsequent S130, a variable n indicating the content is initialized to "1." The processing is performed on the 1st content, the 2nd content, the 3rd content, and so on each time variable n is incremented.

At subsequent S140, an area search is made. This process searches for all areas to which contents have not yet been assigned.

At S150, an area is excluded based on the hierarchical data structure. This process excludes a certain area that is assigned no content but a content is assigned to an area located higher than the certain area in the hierarchical data structure. As illustrated in FIG. 3(c), for example, when a content is assigned to area 2, the areas 4 and 5 are excluded.

At S160, an area is excluded based on the content size and the area size. The process excludes an area whose area size is smaller than the content size of a content to be assigned.

At S170, an area is excluded based on assignment management. Specifically, this process excludes an area having no correspondence relation with the content, based on the correspondence relationship stored in the assignment management section 13.

At S180, evaluation values are calculated and an area having the largest evaluation value is selected. This process uses a predetermined calculation expression to calculate evaluation values and selects an area having the largest evaluation value.

Specifically, the evaluation value includes a driver evaluation value (DE), a front-seat passenger evaluation value (AE), and a rear-seat passenger evaluation value (RE). To simplify equations, the driver is expressed as "D," the front-seat passenger as "A," and the rear-seat passenger as "R." The present embodiment defines the evaluation values as follows:

$$DE=K[D] \times \text{information value } [D] \times \text{area suitability}$$

$$[D]AE=K[A] \times \text{information value } [A] \times \text{area suitability}$$

$$[A]RE=K[R] \times \text{information value } [R] \times \text{area suitability}$$
$$[R]$$

In these equations, K[D], K[A], and K[R] denote the presence of a driver, the presence of a front-seat passenger, and the presence of a rear-seat passenger, respectively, and are set to "1" when they are aboard or to "0" otherwise.

The evaluation value to be obtained is expressed as follows.

$$\text{evaluation value}=DE+AE+RE$$

At S190, assignment of the content having the largest evaluation value provided at S180 to the area is stored.

At S200, it is determined whether the variable n equals the number N of contents. This I process determines whether all contents have been processed. If the determination results in n=N (YES at S200), the process proceeds to S220. If the determination results in n≠N (S200: NO), an unprocessed content remains. The process increments the variable n at S210 and the process repeats from S140.

At S220, the contents are displayed based on the assignment of the contents to the areas stored at S100, S110, and S190. It is noted that the display layout control section may execute S220. Thereafter, the display control process is ended.

Although the display control process has been described above, their concrete examples will be illustrated to provide a better picture of the new-instruction process of FIG. 5 and a better understanding of "first-com-win" and "later-come-win".

As shown in FIG. 12(a), it is assumed that the contents are "back monitor", "incoming call information" and "audio information". Mediation between these contents will be explained. In FIG. 12(a), the contents vertically aligned on a left side denote present contents, which are contents presently displayed. The contents horizontally aligned in a top row denote new contents, which are contents for which display requests are generated. Specifically, in FIG. 12(a), (1) signifies that during display of the present content "back monitor", a display request to display a new content "incoming call information" Is generated. Likewise, in FIG. 12(a), (2) signifies that during display of the present content "back monitor", a display request to display a new content "audio information" is generated. In FIG. 12(a), (3) signifies that during display of the present content "incoming call information", a display request to display a new content "back monitor" is generated. In FIG. 12(a), (4) signifies that during display of the present content "Incoming call information", a display request to display a new content "audio information" is generated. In FIG. 12(a), (5) signifies that during display of the present content "audio information", a display request to display a new content "back monitor" is generated. In FIG. 12(a), (6) signifies that during display of the present content "audio information", a display request to display a new content "incoming call information" is generated.

In the above, as shown in FIG. 12(b), an assignment target area is "area 1" (highest hierarchy area) in FIG. 3. The back monitor has the importance degree "7", the wait permission-or-prohibition "prohibition of waiting", the return permission-or-prohibition "prohibition of returning", and the later-come-win for same-importance degree "occurrence". Likewise, the incoming call information has the importance degree "5", the wait permission-or-prohibition "permission of waiting", the return permission-or-prohibition "permission of returning", and the later-come-win for same-importance degree "occurrence". The audio information has the importance degree "3", the wait permission-or-prohibition "prohibition of waiting", the return permission-or-prohibition "prohibition of returning", and the later-come-win for same-importance degree "occurrence". The insertion importance degree "8" is configured in the audio information.

Figure 13:
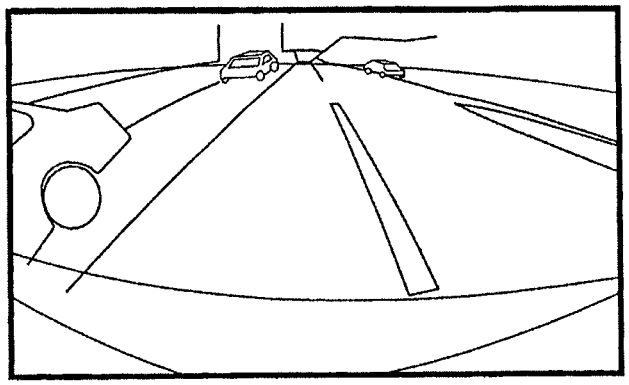
FIG. 13 is an explanatory diagram showing an example of display of each content.
Figure 13:
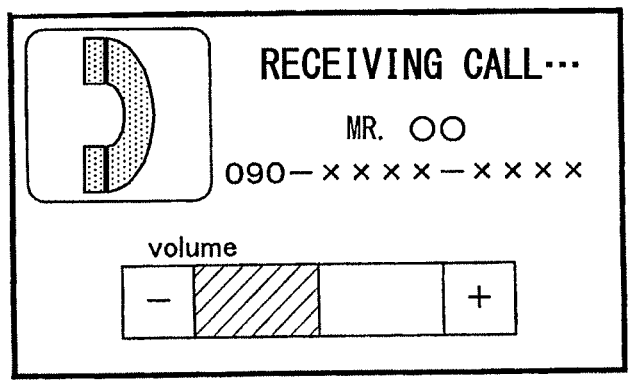
Figure 13:
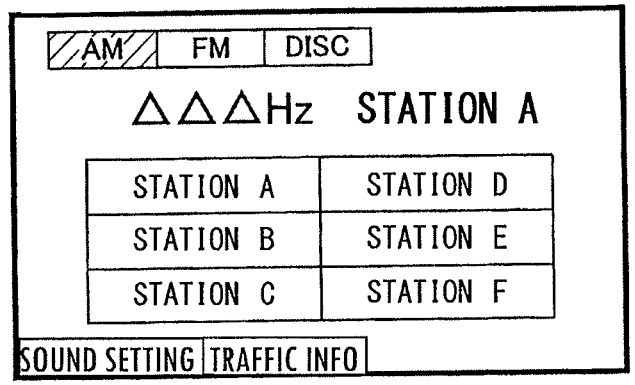

FIG. 13(a) to (c), respectively, Illustrate, examples of display of the content illustrated in FIGS. 12(a) and (b). FIG. 13(a) is an example of display of "back monitor". FIG. 13(b) is an example of display of "incoming call information". FIG. 13(c) is an example of display of "audio information".

In the below, explanation will be given on each case (1) to (6) in FIG. 12(a).

Figure 14:
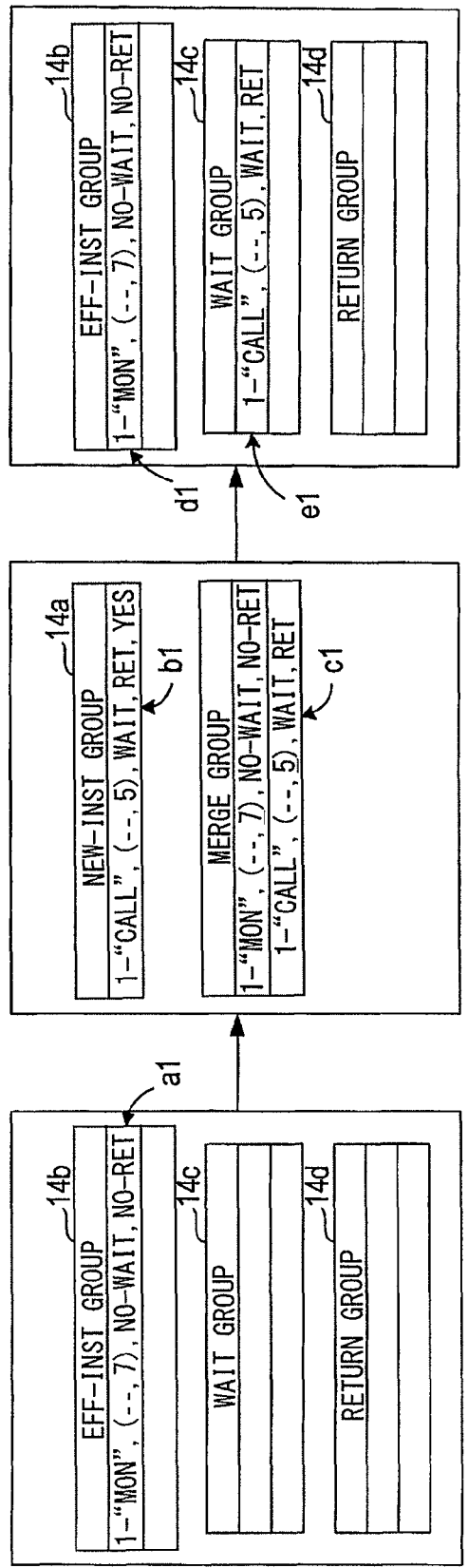
FIG. 14(a) and FIG. 14(b) are explanatory diagrams showing a concrete example of mediation when a request to display a new content "incoming call information" is generated against the present content "back monitor"
Figure 14:
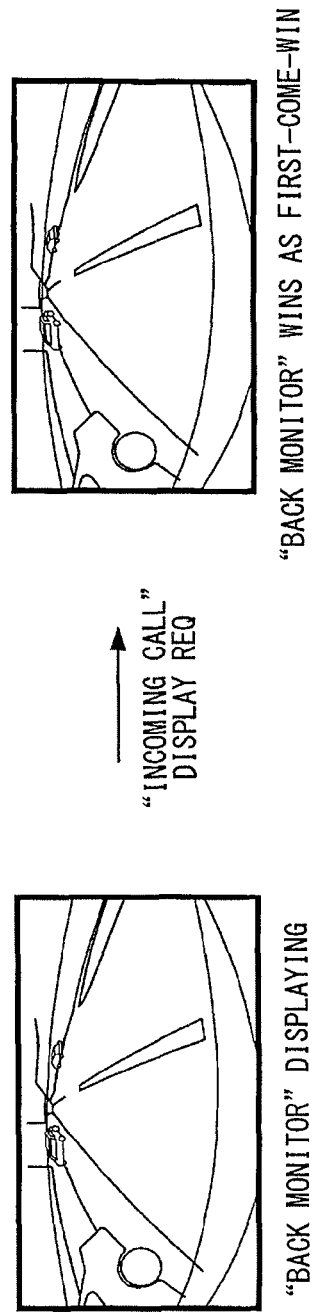

FIG. 14(a) illustrates the case (1). In the case (1), during the display of the present content "back monitor", a display request to display a new content "incoming call information" is generated.

As shown in FIG. 14(a), because the present content "back monitor" is being displayed, the effective instruction group 14b contains the arrangement instruction of "back monitor" (see the symbol a1). The display request for the new content "incoming call information" corresponds to the arrangement instruction for "incoming call information" added to the new-instruction group 14a (see the symbol b1). Then, the merge between the new-instruction group 14a and the effective instruction group 14b is executed (S300 in FIG. 5).

In the above, since the back monitor has the importance degree "7" and since the incoming call information has the importance degree "5", the arrangement instruction of the back monitor is placed at the top of the merge group (see the symbol c1).

Next, it is determined that the arrangement instruction of the back monitor" is assignable (S320: YES in FIG. 5), the arrangement instruction of the back monitor is moved to (in this case, stays) the effective instruction group 14b (S380). This is shown by the symbol d1. It is determined that the arrangement instruction of "incoming call information" is not assignable (S320: NO). Since the arrangement instruction of the incoming call information" is a new instruction and has "permission of waiting" (S350: YES), it is moved to the wait group 14c (S360). This is shown by the symbol e1.

Through the above, when the display request for the new content "incoming call information" is generated during the display of the present content "back monitor", the content "back monitor" wins as "first-come-win", as shown in FIG. 14(b).

Figure 15:
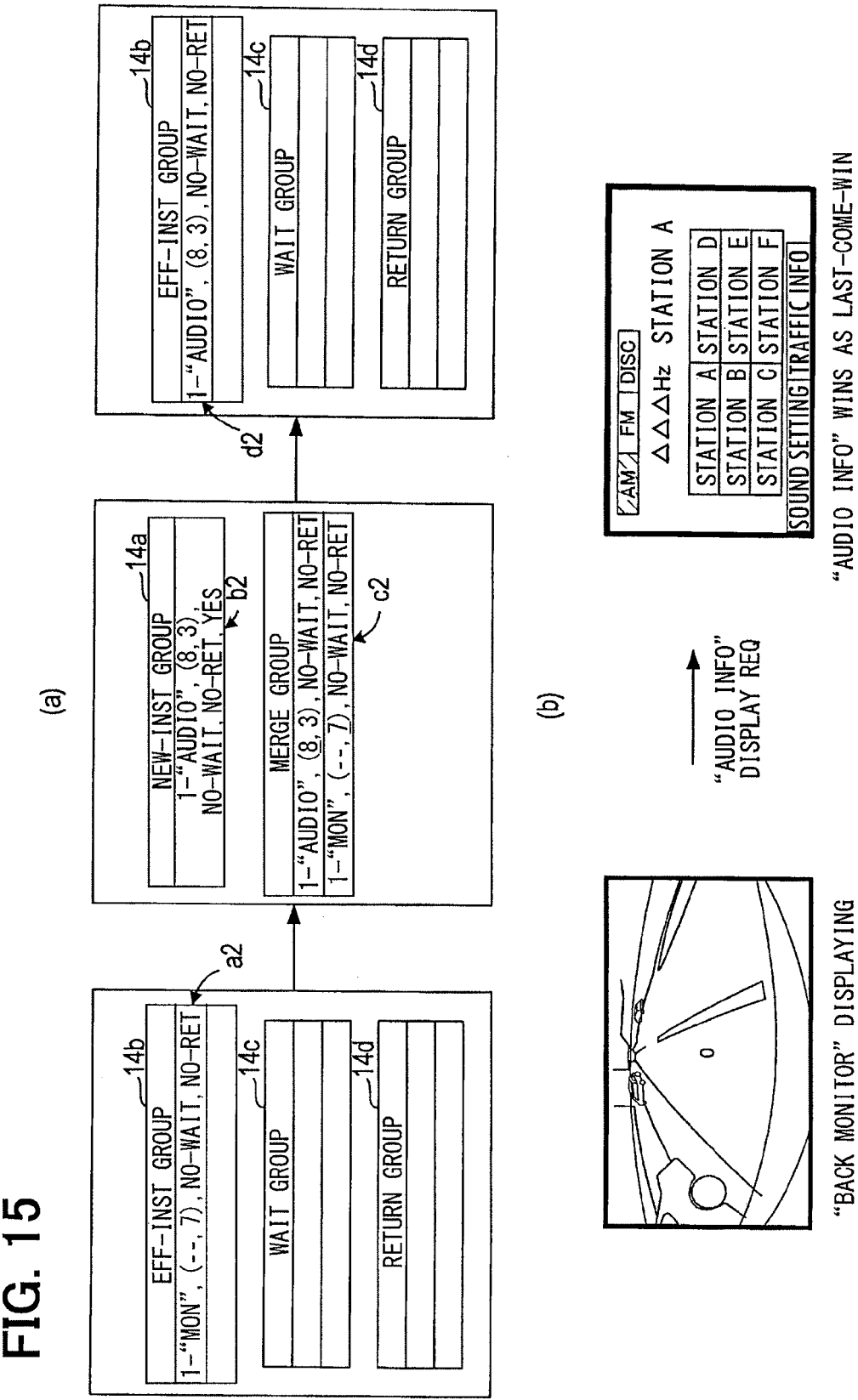
FIG. 15(a) and FIG. 15(b) are explanatory diagrams showing a concrete example of mediation when a request to display a new content "audio information" is generated against the present content "back monitor"

FIG. 15(a) illustrates the case (2). In the case (2), during the display of the present content "back monitor", a display request to display a new content "audio information" Is generated.

As shown in FIG. 15(a), because the present content "back monitor" is being displayed, the effective instruction group 14b contains the arrangement instruction of "back monitor" (see the symbol a2). The display request for the new content "audio information" corresponds to the arrangement instruction for "audio information" added to the new-instruction group 14a (see the symbol b2). Then, the merge between the new-instruction group 14a and the effective instruction group 14b is executed (S300 in FIG. 5).

In the above, since the back monitor has the importance degree "7" and since the audio information has the insertion importance degree "8", the arrangement instruction of the audio information is placed at the top of the merge group (see the symbol c2).

Next, it is determined that the arrangement instruction of the audio information is assignable (S320: YES in FIG. 5), the arrangement instruction of the audio information is moved to the effective instruction group 14b (S380). This is denoted by the symbol d2. It is determined that the arrangement instruction of the back monitor is not assignable (S320: NO). In this case, since the arrangement instruction of the back monitor is the effective instruction and has "prohibition of waiting" (S330: NO), it is deleted without being moved to the return group 14d (S370).

Through the above, when the display request for the new content "audio information" is generated during the display of the present content "back monitor", the content "audio information" wins as "later-come-win", as shown in FIG. 15(b).

Figure 16:
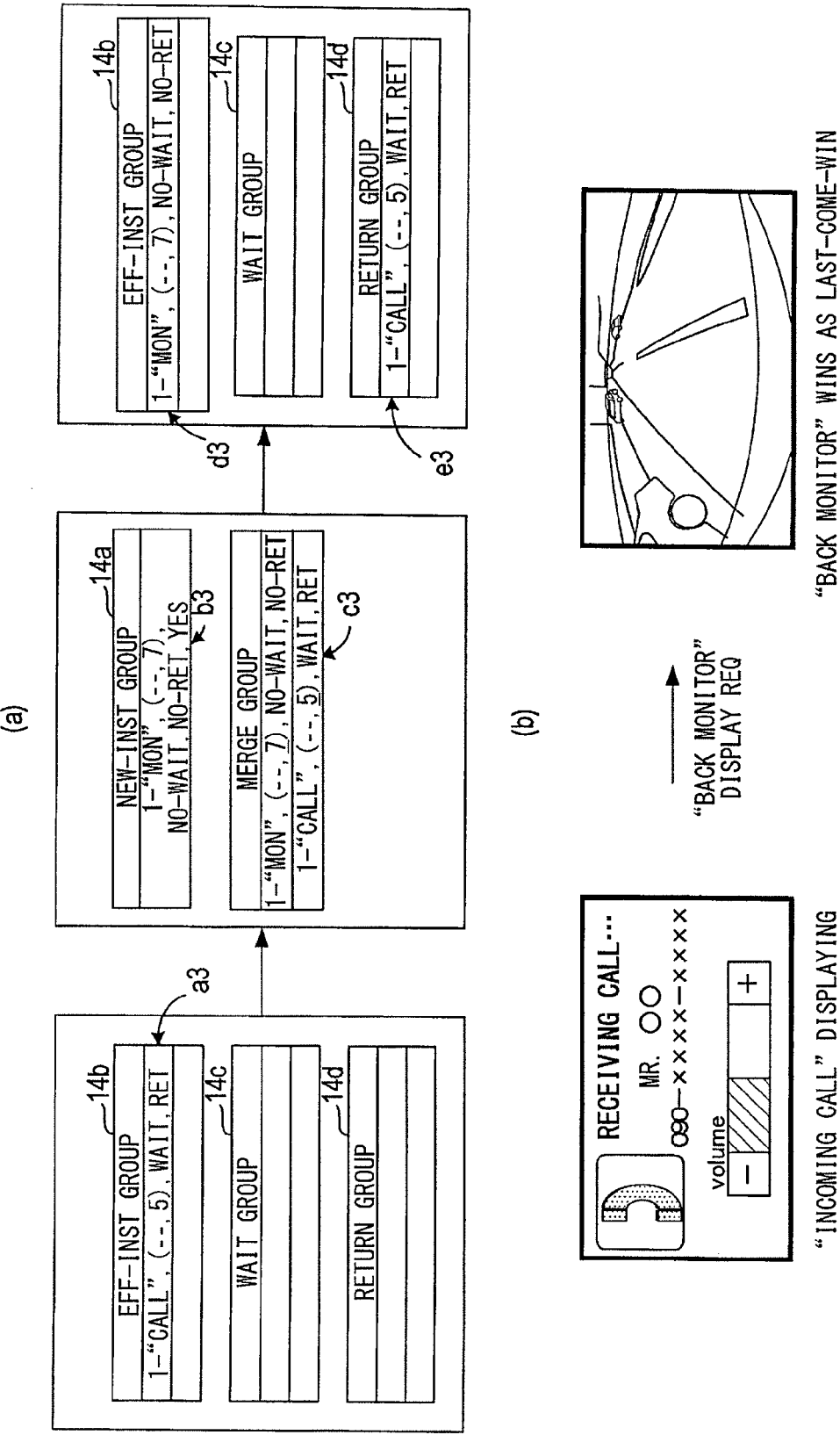
FIG. 16(a) and FIG. 16(b) explanatory diagrams showing a concrete example of mediation when a request to display a new content "back monitor" is generated against the present content "Incoming call information"

FIG. 16(a) illustrates the case (3). In the case (3), during the display of the present content "incoming call information", a display request to display a new content "back monitor" is generated.

As shown in FIG. 16(a), because the present content "incoming call information" is being displayed, the effective instruction group 14b contains the arrangement instruction of "incoming call information" (see the symbol a3). The display request for the new content "back monitor" corresponds to the arrangement instruction for "back monitor" added to the new-instruction group 14a (see the symbol b3). Then, the merge between the new-instruction group 14a and the effective instruction group 14b is executed (S300 in FIG. 5).

In the above, since the incoming call information has the importance degree "5" and since the back monitor has the importance degree "7", the arrangement instruction of the back monitor is placed at the top of the merge group (see the symbol c3).

Next, it is determined that the arrangement instruction of the back monitor is assignable (S320: YES in FIG. 5), and the arrangement instruction of the back monitor is moved to the effective instruction group 14b (S380). This is shown by the symbol d3. It is determined that the arrangement instruction of "incoming call information" is not assignable (S320: NO). Since the arrangement instruction of the incoming call information is an effective instruction and has "permission of returning (S330: YES), it is moved to the return group 14d (S340). This is shown by the symbol e3.

Through the above, when the display request for the new content "back monitor" is generated during the display of the present content "incoming call information", the content "back monitor" wins as "later-come-win", as shown in FIG. 16(b).

Figure 17:
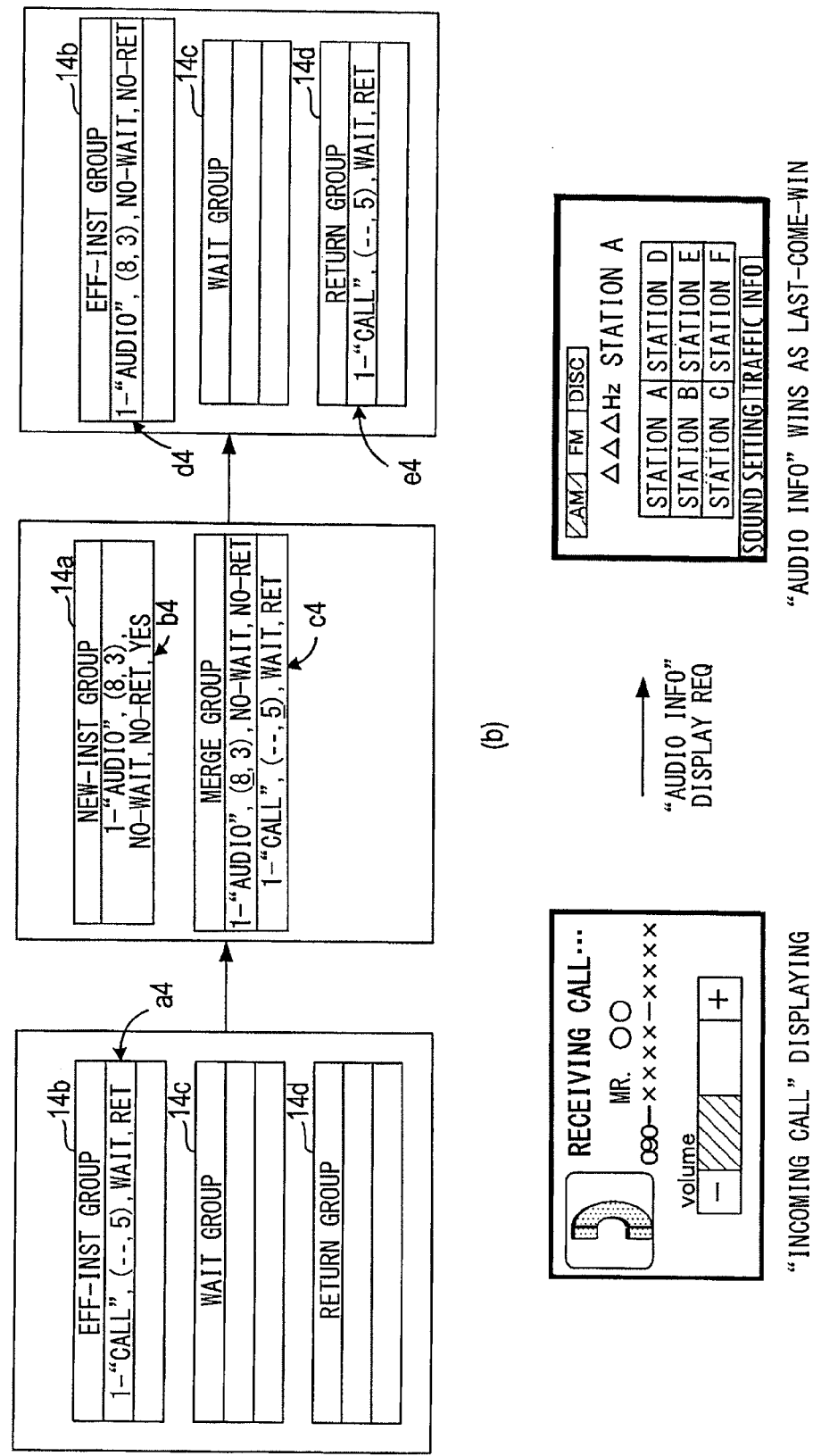
FIG. 17(a) and FIG. 17(b) explanatory diagrams showing a concrete example of mediation when a request to display a new content "audio information" is generated against the present content "incoming call information"

FIG. 17(a) illustrates the case (4). In the case (4), during the display of the present content "incoming call information", a display request to display a new content "audio information" is generated.

As shown in FIG. 17(a), because the present content "incoming call information" is being displayed, the effective instruction group 14b contains the arrangement instruction of "incoming call information" (see the symbol a4). The display request for the new content "audio information" corresponds to the arrangement instruction for "audio information" added to the new-instruction group 14a (see the symbol b4). Then, the merge between the new-instruction group 14a and the effective instruction group 14b is executed (S300 in FIG. 5).

In the above, since the incoming call information has the importance degree "5" and since the audio information has the insertion importance degree "8", the arrangement instruction of the audio information is placed at the top of the merge group (see the symbol c4).

Next, it is determined that the arrangement instruction of the audio information" is assignable (S320: YES in FIG. 5), the arrangement instruction of the audio information is moved to the effective instruction group 14b (S380). This is shown by the symbol d4. It is determined that the arrangement instruction of the Incoming call information is not assignable (S320: NO). Since the arrangement instruction of the incoming call information" is an effective instruction and has "permission of returning (S330: YES), it is moved to the return group 14d (S340). This is shown by the symbol e4.

Through the above, when the display request for the new content "audio information" is generated during the display of the present content "incoming call information", the content "audio information wins as "later-come-win", as shown in FIG. 17(b).

Figure 18:
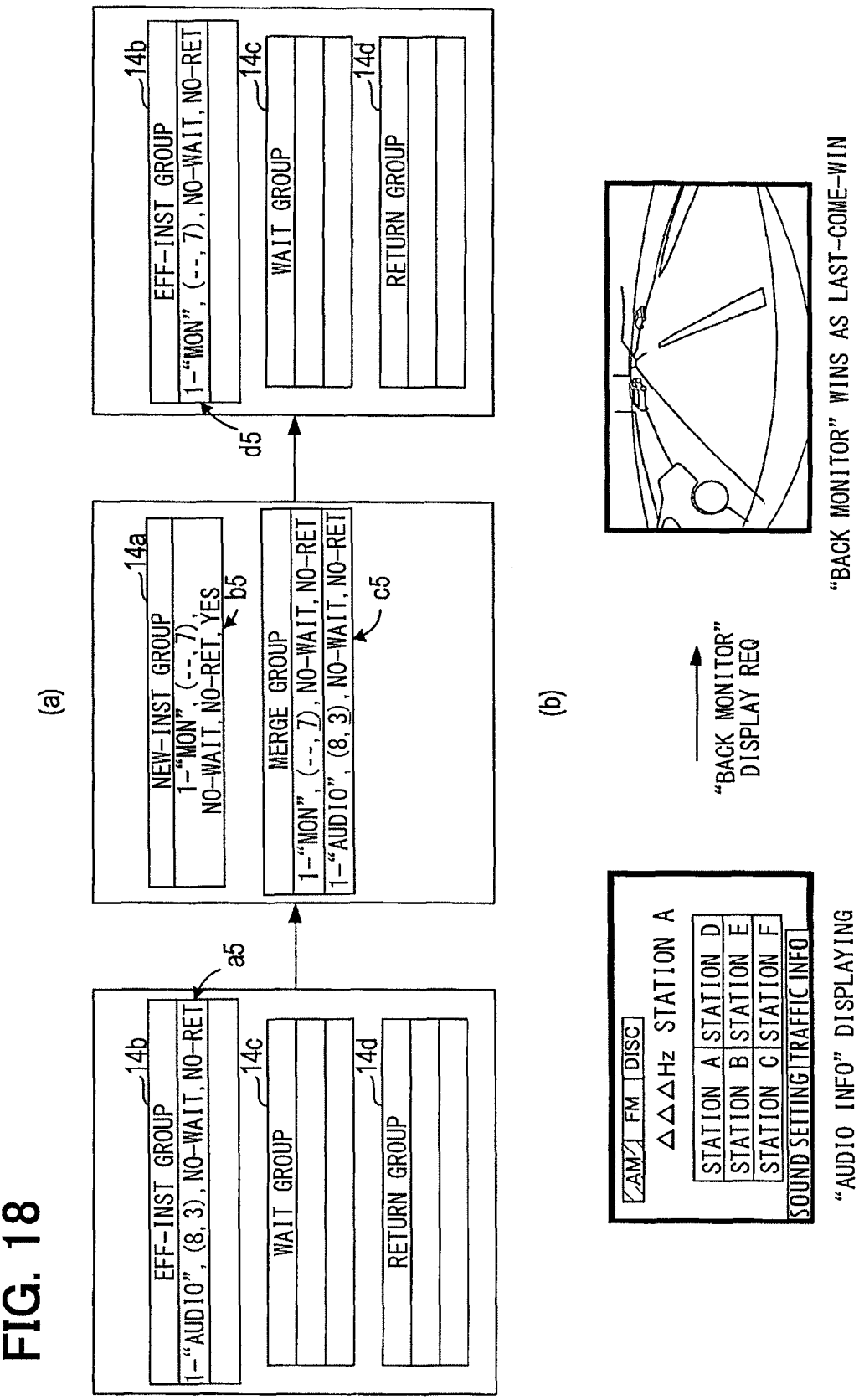
FIG. 18(a) and FIG. 18(b) explanatory diagrams showing a concrete example of mediation when a request to display a new content "back monitor" is generated against the present content "audio information"

FIG. 18(a) illustrates the case (5). In the case (5), during the display of the present content "audio information", a display request to display a new content "back monitor" is generated.

As shown in FIG. 18(a), because the present content "audio information" Is being displayed, the effective instruction group 14b contains the arrangement instruction of audio information (see the symbol a5). The display request for the new content "back monitor" corresponds to the arrangement instruction for "back monitor" added to the new-instruction group 14a (see the symbol b5). Then, the merge between the new-instruction group 14a and the effective instruction group 14b is executed (S300 in FIG. 5).

In the above, since the back monitor has the importance degree "7" and since the audio information has the importance degree "3", the arrangement instruction of the back monitor is placed at the top of the merge group (see the symbol c5). In the above, the importance degree is used for the audio information.

Next, it is determined that the arrangement instruction of the back monitor is assignable (S320: YES in FIG. 5), the arrangement instruction of the back monitor is moved to the effective instruction group 14b (S380). This is shown by the symbol d5. It is determined that the arrangement instruction of the audio information" is not assignable (S320: NO). In this case, since the arrangement instruction of the audio information" is the effective instruction and has "prohibition of returning" (S330: NO), it is deleted without being moved to the return group 14d (S370).

Through the above, when the display request for the new content "back monitor" is generated during the display of the present content "audio information", the content "back monitor" wins as "later-come-win", as shown in FIG. 18(b).

Figure 19:
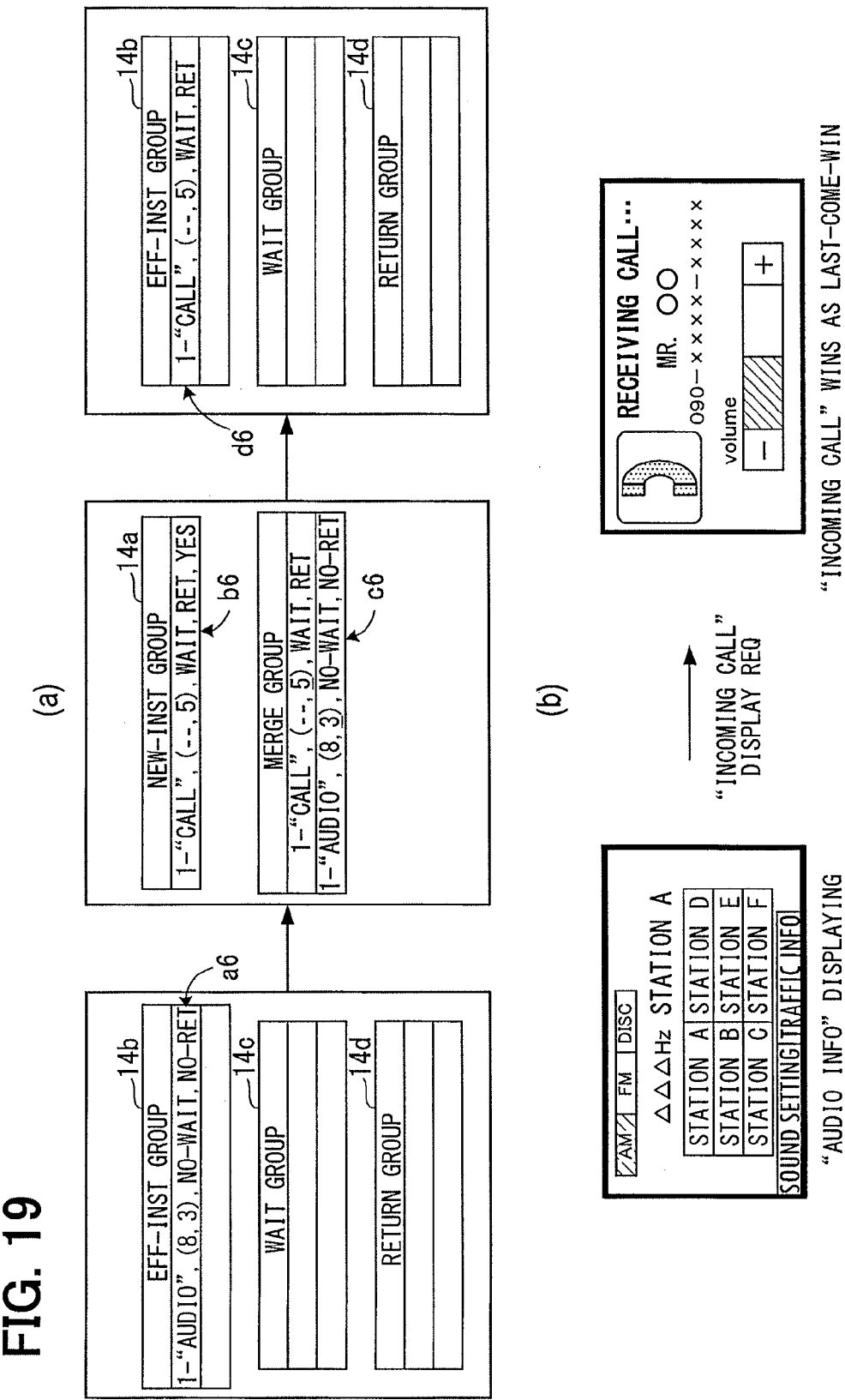
FIG. 19(a) and FIG. 19(b) explanatory diagrams showing a concrete example of mediation when a request to display a new content "incoming call information" is generated against the present content "audio information."

FIG. 19(a) illustrates the case (6). In the case (6), during the display of the present content "audio information", a display request to display a new content "incoming call information" is generated.

As shown in FIG. 19(a), because the present content "audio information" Is being displayed, the effective instruction group 14b contains the arrangement instruction of "audio information" (see the symbol a6). The display request for the new content "incoming call information is the arrangement instruction for "Incoming call information" added to the new-instruction group 14a (see the symbol b6). Then, the merge between the new-instruction group 14a and the effective instruction group 14b is executed (S300 in FIG. 5).

In the above, since the incoming call information has the importance degree "5" and since the audio information has the importance degree "3", the arrangement instruction of the incoming call information is placed at the top of the merge group (see the symbol c6). In the above, the importance degree is used for the audio information.

Next, it is determined that the arrangement instruction of the incoming call information" is assignable (S320: YES in FIG. 5), the arrangement instruction of the incoming call information is moved to the effective instruction group 14b (S380). This is shown by the symbol d6. It is determined that the arrangement instruction of the audio information" is not assignable (S320: NO). In this case, since the arrangement instruction of the audio information" is the effective instruction and has "prohibition of returning" (S330: NO), it is deleted without being moved to the return group 14d (S370).

Through the above, when the display request for the new content "incoming call information" is generated during the display of the present content "audio information", the content "Incoming call information" wins as "later-come-win", as shown in FIG. 19(b).

There may be a situation in which the display request for the content "incoming call information" or the like may disappear because an incoming call of a phone or the like stops. In this case, a search of all the groups 14a to 14d is made, so that the arrangement instruction of the content for which the display request disappears is deleted.

Technical effects provided by the display control apparatus 1 of the present embodiment will be described.

The present embodiment is provided with the mediation section 15a (corresponding to mediation means) and the content assignment section 15b (corresponding to content assignment section). When a display request to display a new content, which is other than a present content, to an area is generated in a situation where the present content is being displayed on the area, the mediation section 15a selects either one of the present content and the new content as a display target of the area based on an importance degree of the present content and an importance degree of the new content. Based on a result of the selecting by the mediation section 15a, the content assignment section 15b assigns the present content or the new content to the area as the display target. This can provide situation-adapted later-com-win and situation-adapted first-come-win without matrixing the screen transitions.

Further, the present embodiment supports a new display request from a system, such as contents "incoming call information", "back monitor" or the like. Specifically, new display instructions include a display instruction that is generated independent of a display instruction from a user. This provides appropriate situation-adapted display.

Furthermore, in the present embodiment, the display request for some of the contents such as audio information and the like is generated based on a display instruction from a user. In such contents, "insertion importance degree" in addition to "importance degree" is configured and the mediation is executed based on this "insertion importance degree" (S300 in FIG. 5). Specifically, the insertion importance degree of a new content of the new display instruction that is based on a display instruction from a user is set higher than the importance degree of a new content of a display instruction that is independent of a display instruction from a user. This provides an appropriate display placing priority to an instruction from a user.

Furthermore, in the present embodiment, when the result of the mediation selects the present content (in the case of "first-come-win"), it is determined whether or not the content losing in the mediation has permission of waiting (S350 in FIG. 5). When the content losing in the mediation has permission of waiting (S350: YES); this content is moved to the wait group 14c (see S360, FIG. 14(a)). Thereafter, when the content is assignable (S430: YES in FIG. 8), the arrangement instruction in the wait group 14c is moved to the effective instruction group 14b (S440: YES, S450). Specifically, when the mediation section selects the present content, the new content is managed as a waiting state. When the present content becomes a non-display state, the new content in the waiting state is selected by the mediation section. In this way, the not displayed new content can be displayed later.

In the present embodiment, the mediation between the present content and the new content is executed to determine the arrangement of the content to the area. Thereafter, it is determined whether the content in the waiting state is arrangeable (S430 in FIG. 8). It is conceivable that when a display request for a new content is generated, the mediation between the present content, the new content and the waiting state content is executed based on the importance degrees of respective contents. Specifically, when the mediation section selects the present content, the new content is managed as the waiting state. Then, when a further-new display request is generated, the mediation section selects one of the contents based on the Importance degrees of the new content, the present content presently-displayed, the content in the waiting state. This also provides appropriate situation-adapted display.

As discussed the above in part, in the present embodiment the merge between the new-instruction group 14a and the effective instruction group 14b is executed based on the importance degrees (see S300 in FIG. 5, see FIG. 6(a)~(c)).

Thereafter, the arrangement instructions after the merge are acquired one by one from the top (S310), and it is determined whether each arrangement instruction is assignable (S320). When the arrangement instruction is assignable, the correspondence relationship between the area and the content is stored and the arrangement instruction is moved to the effective instruction group 14b (S380). Specifically, the mediation section 15a (corresponding to mediation means) executes mediation between a new instruction, which is an arrangement instruction to newly arrange a content to an area, and an effective instruction, which is an arrangement instruction presently adopted, based on the importance degrees of the two instructions. Based on the mediation between the arrangement instructions by the mediation section 15a, the content assignment section 15b (corresponding to content assignment means) selects an arrangement instruction providing no duplication of contents or areas and performs assignment of the contents to the areas. Because of this, when an arrangement instruction to arrange a specified content to a specified area is newly generated, it is possible to arrange the contents while ensuring the consistency with the presently-adopted arrangement instruction.

Furthermore, in the present embodiment, when the mediation between the new-instruction group 14a and the effective instruction group 14b is executed in the merge between the new-instruction group 14a and the effective instruction group 14b, "insertion importance degree" is used for the new-instruction group 14a (S300 in FIG. 5). Specifically, when the arrangement instruction has the insertion importance degree other than the importance degree, the mediation section 15a executes the mediation based on the insertion importance degree of the new instruction and the importance degree of the effective instruction. Accordingly, by configuring a relatively higher insertion importance degree in a user-operation-based arrangement instruction, it becomes possible to preferentially select this arrangement instruction.

Furthermore, in the present embodiment, an arrangement instruction of the new-instruction group 14a has later-come-win information for same-importance degree-case. When the same importance degrees (insertion importance degree) are found in the merge between the new-instruction group 14a and the effective instruction group 14b, a priority relationship between the arrangement instruction in the new-instruction group 14a and the arrangement instruction in the effective instruction group 14b is determined based on the later-come-win information for same-importance degree-case. Specifically, when the new instruction has an inferior-to-superior information indicating inferiority or superiority relative to the effective instruction, the mediation section 15a executes the mediation using the inferior-to-superior information together with the importance degrees. This facilitates determination of inferiority or superiority between arrangement instructions.

Furthermore, in the present embodiment, when an arrangement instruction is not assignable and is contained in the new instruction group 14a (S350: YES in FIG. 5), the arrangement instruction is moved to the wait group 14c (S360). Thereafter, the assignment is performed based on the wait group 14c (S420, S430 in FIG. 8). Specifically, when the new instruction is not selected, the storage control section 15c stores the new instruction as a wait instruction in the arrangement instruction management section 14. After performing the assignment based on the selected arrangement instruction, the content assignment section 15b selects the wait instruction providing no duplication of the contents or the areas based on the wait instruction(s) stored in the arrangement instruction management section 14 and performs the assignment of the contents to the areas. In this way, when the priority is given to the presently-adopted arrangement instruction over the new arrangement instruction ("first-come-win"), the assignment of the content based on the new arrangement instruction can be performed later.

In the above, based on the information on wait permission-or-prohibition of arrangement instructions, an arrangement instruction having permission of waiting is moved to the wait group 14c (S350, S360 in FIG. 5). Specifically, an arrangement instruction has information indicating permission or prohibition of waiting. When a new instruction has the information indicating the permission of waiting, the storage control section 15c stores the new instruction as the wait instruction in the arrangement instruction management section 14. This enables a predetermined arrangement instruction to wait.

In the wait group 14c, the arrangement instructions are sorted in chronological order. Specifically, the storage control section 15c stores new instructions in the arrangement instruction management section 14 so that the chronological order of the new instructions is maintained. Because of this, the assignment of contents based on the wait instruction can be performed in an appropriate order.

Furthermore, in the present embodiment, when an arrangement instruction that is not assignable is contained in the effective instruction group 14b (S330: YES in FIG. 5), this arrangement instruction is moved to the return group 14d (S340). Thereafter, the assignment based on the return group 14d is performed (S420, S430 in FIG. 8). Specifically, when the effective instruction is not selected, the storage control section 15c stores the effective instruction as a return instruction in the arrangement instruction management section 14. After assigning the selected arrangement instruction, the content assignment section 15b selects the return instruction providing no duplication of the contents or the areas based the return instruction stored in the arrangement instruction management section 14 and performs the assignment of the contents to the areas. According to this, when the priority is given to a new arrangement instruction over the presently-adopted arrangement instruction ("later-come-win"), the assignment of the content based on the previously-adopted arrangement instruction can be performed later.

In the above, the arrangement instruction having permission of returning is moved to the return group 14d based on information on the return permission-or-prohibition of the arrangement instruction (S330, S340 in FIG. 5). That is, an arrangement instruction has information indicating permission or prohibition of returning. When the effective instruction has the information indicating permission of returning, the storage control section 15c stores the effective instruction as the return instruction in the arrangement instruction management section 14. This enables a predetermined arrangement instruction to return.

In the return group 14d, the arrangement instructions are sorted in a reverse chronological order. Specifically, the storage control section 15c stores return instructions in the arrangement instruction management section 14 so as to maintain the chronological order of the effective instructions. Because of this, the assignment of contents based on the return instruction can be performed in an appropriate order.

Furthermore, in the present embodiment, the arrangement instruction of the return group 14d and the arrangement instruction of the wait group 14c are inserted into the merge group, and are sorted in an order of importance degree (S400, S410). Specifically, the mediation section 15a executes the mediation between the wait instruction and the return instruction based on the importance degrees.

In this case, the content assignment section 15*b* assigns the content to the area by selecting an arrangement instruction providing no duplication of the areas or the contents based on the mediation between the arrangement instructions by the content assignment section 15*b*. According to this, when both of the wait instruction and the return instruction are present, the assignment of the content based on these instructions can be performed in an appropriate order.

In the above, when an arrangement instruction is inserted into the merge group, the insertion importance degree is used for the inserted arrangement instruction. Specifically, when the arrangement instruction has the insertion importance degree in addition to the importance degree, the mediation section 15*a* executes the mediation by using the insertion importance degree. Accordingly, by configuring a relatively higher insertion importance degree in a user-operation-based arrangement instruction, it is possible to preferentially select this arrangement instruction.

Furthermore, when an arrangement instruction having an insertion importance degree is inserted into a merge group, a partition line is set for each area to search for an insertion place. Specifically, the mediation section 15*a* executes the mediation so that a chronological order of the arrangement instructions having the insertion importance degree is maintained. According to this, the assignment of the content based on the wait instruction and the return instruction can be performed in an appropriate order.

It is noted that for some contents, arrangement instructions are not present. The assignment of such a content to an area is performed based on information value of the content and area suitability of the area. Specifically, the content management section 11 manages contents in association with information value indicating the value of information for each target viewer. The area management section 12 manages areas in association with area suitabilities indicating positional suitabilities of the areas. The control section 15 determines the assignment of a content to an area by using an evaluation value that is based on the information value and the area suitability. Specifically, there are provided the content management section 11, which manages the content in association with the information value indicating the value of information, and the area management section 12, which manages an area in association with area suitability indicating positional suitability of the area. The content for which an arrangement instruction is not present is assigned to an area by the content assignment section 15*b* based on the information value and the area suitability. According to this, because the content for which an arrangement instruction is not present is assigned to an area based on the information value and the area suitability, it is possible to provide information display to a user in an easily-understandable manner.

Furthermore, in the present embodiment, various contents are acquired via the in-vehicle network (see FIG. 1). Specifically, the content management section 11 acquires a content via network in a vehicle. Additionally, the content management section 11 may acquire a content from a newly-connected external apparatus. In this case, the content management section 11 equally various contents in association with "information value", "content size" and "display state" (see FIG. 2). This enables the same algorithm to be used to assign contents to areas regardless of contents types.

Similarly, in the present embodiment, multiple areas of the display 80 apparatuses 21 to 23 are each associated with "area value" and "area size" to manage the areas (see FIG. 2). That is, the area management section 12 may manage areas of multiple display apparatuses 21, 22, 23. Even if the display apparatuses 21 to 23 are different, this enables the same algorithm to be used to determine an area to which a content is to be assigned, Embodiments of the present disclosure are not limited to the above-illustrated embodiments.

For example, as described above, when the content and the area are managed only by their attributes, it becomes possible to use the same algorithm to assign a content to an area regardless of content type and regardless of distinction between display apparatuses 21 to 23. For example, if any one of the display apparatus 21 through the display apparatus 23 falls, the display control apparatus 1 of the above-mentioned embodiments allows the area management section 12 to 16 update the management information and enables assignment of contents to areas without changing the algorithm. Similarly, it is easy to additionally connect a display apparatus 50 as illustrated in FIG. 1. Also in this case, the area management section 12 may update the management information to conform to the display apparatus 50. The display apparatus 50 may be, for example, a mobile telephone such as smartphone, information terminals including PDA, or the like. The area information may be acquired from the display apparatus 50 itself. That is, when some of the display apparatuses 21, 22, 23, 50 are attached or detached, the area management section may update the areas to be managed.

In the above embodiments, based on the information value of the content and the area suitability of the area, the evaluation value is calculated. Alternatively, a visual line characteristic, an expressiveness characteristic, an operation characteristic are adopted as information characteristics of a content and area characteristics of an area.

According to the present disclosure, a display control apparatus can be provided in various modes.

For example, according to a first mode of the present disclosure, a display control apparatus for assigning a content to an area configured as a display region on a screen of a display mounted to a vehicle and for displaying the content is provided. The display control apparatus includes a mediation section (mediation means) and a content assignment section (assignment means).

The mediation section selects either one of a present content and a new content different from the present content as a display target of the area based on an importance degree of the new content and an importance degree of the present content when a new display instruction to display the new content to the area is generated during displaying of the present content on the area.

The content assignment section performs assignment of the new content or the present content as the display target to the area based on a result of the selecting by the mediation section.

This can provide situation-adapted later-corn-win and situation-adapted first-come-win without matrixing the screen transitions.

In the above display control apparatus, the new display instruction may be generated independent of an instruction from a user, whereas in the above-described Patent Document 1, the assignment is determined based on an instruction from a user.

For example, this includes a new display instruction from a system for contents "incoming call information" and "back monitor". This also provides appropriate situation-adapted display.

Furthermore, the importance degree of the content of the display instruction that is based on an instruction from a user may be set to be larger than the importance degree of the content of the display instruction that is independent of an instruction from a user.

Furthermore, the new content may be managed as a waiting state when the present content is selected by the mediation section, and the new content may be selected by the mediation section when the present content becomes a non-display state (S350: YES, S360, S430: YES, S440: YES, S450).

Furthermore, when the present content is selected by the mediation section, the new content may be managed as a waiting state. When a further-new display instruction is generated, the mediation section may select one of the further-new content, the new-content in the waiting state and the displayed present content based on the importance degrees of the further-new content, the new-content in the waiting state and the displayed present content.

According to a second mode of the present disclosure, a display control apparatus for assigning contents to a plurality of areas configured as display regions on a screen of a display mounted to a vehicle and for displaying the contents is provided. The display control apparatus comprises a mediation section and a content assignment section. The mediation section executes mediation between a new instruction and an effective instruction based on an importance degree of the new instruction and an importance degree of the effective instruction. The new instruction is an arrangement instruction to newly arrange a content to an area. The effective instruction is an arrangement instruction presently adopted. The content assignment section selects an arrangement instruction providing no duplication of the contents or the areas based on the mediation between the arrangement instructions by the mediation section, and performs assignment of the contents to the areas.

That is, the contents are assigned by executing the medication based on the importance degree of the new instruction, which is an arrangement instruction to newly arrange a content to an area, and the effective instruction, which is an arrangement instruction presently adopted. Accordingly, when an arrangement instruction to arrange a specified content to a specified area is newly generated, it is possible to arrange the contents while ensuring the consistency with the presently-adopted arrangement instruction.

In some cases, multiple arrangement instructions may be the new instructions and multiple arrangement instructions may be the effective instructions. In this regard, arrangement instructions are operated as a new instruction group 14*a* and arrangement instructions are operated as an effective instruction group 14*b*.

In the above display control apparatus, when the arrangement instruction has an insertion importance degree other than the importance degree, the mediation section may execute the mediation based on the insertion importance degree of the new instruction and the importance degree of the effective instruction (S300).

Furthermore, when the new instruction has inferior-to-superior information indicating inferiority or superiority relative to the effective instruction, the mediation section may execute the mediation using the inferior-to-superior information together with the importance degrees (S300).

Furthermore, the above display control apparatus may further comprises storage control section storing the new instruction as a wait instruction in an arrangement instruction management section when the new instruction is not selected. After performing the assignment based on the selected arrangement instruction, the content assignment section may select the wait instruction providing no duplication of the contents and the areas based on the wait instruction stored in the arrangement instruction management section and may perform the assignment of the contents to the areas.

Furthermore, an arrangement instruction may have information indicating permission or prohibition of waiting. When the new instruction has the information indicating the permission of waiting, the storage control section stores the new instruction as the wait instruction in the arrangement instruction management section (S330: YES, S360).

Furthermore, the storage control section may store the new instruction as a wait instruction in the arrangement instruction management section so that a chronological order of the new instructions is maintained.

Furthermore, when the effective instruction is not selected, the storage control section may store the effective instruction as a return instruction in an arrangement instruction management section. After assigning the selected arrangement instruction, the content assignment section may select the return instruction providing no duplication of the contents and the areas based the return instruction stored in the arrangement instruction management section and may perform the assignment of the contents to the areas.

Furthermore, an arrangement instruction may have information indicating permission or prohibition of returning. When the effective instruction has the information indicating the permission of returning, the storage control section may store the effective instruction as the return instruction in the arrangement instruction management section (S330: YES, S340).

Furthermore, the storage control section may store the return instructions in the arrangement instruction management section so that a chronological order of the effective instructions is maintained.

Furthermore, the mediation section may execute the mediation between the wait instruction and the return instruction based on the importance degrees (S400, S410). Based on the mediation between the arrangement instructions by the mediation section, the content assignment section may select the arrangement instruction providing no duplication of the contents and the areas and may assign the contents to the areas.

Furthermore, when the arrangement instruction has an insertion importance degree other than the importance degree, the mediation section may execute the mediation using the insertion importance degree.

Furthermore, the mediation section may execute the mediation so that a chronological order of the arrangement instructions having the insertion importance degrees is maintained.

Although embodiments, configurations, and modes have been illustrated in the above, the present disclosure is not limited to the above-mentioned embodiments, configurations, and modes. The technical scope of the disclosure also includes embodiments, configurations, and modes that may result from an appropriate combination of the technical sections disclosed in different embodiments, configurations, and modes.

The invention claimed is:

1. A display control apparatus for assigning a content to an area configured as a display region on a screen of a display mounted to a vehicle and for displaying the content, the display control apparatus comprising:

a controller, the controller is configured to
    select, in a mediation section, either one of a present content and a new content different from the present content as a display target of the area based on an importance degree of a new instruction and an importance degree of an effective instruction when the new instruction, which is a new display instruction to display the new content to the area, is generated during displaying of the present content on the area, wherein the effective instruction is a display instruction to display the present content;
    perform, in a content assignment section, assignment of the new content or the present content as the display target to the area based on a result of the selecting by the mediation section; and
    store, by a storage control section, the new instruction as a wait instruction in an arrangement instruction management section when the new instruction is not selected,
wherein:
a display instruction has information indicating permission or prohibition of waiting;
when the new instruction has the information indicating the permission of waiting, the storage control section stores the new instruction as the wait instruction in the arrangement instruction management section;
after performing the assignment based on the content selected by the mediation section, the content assignment section assigns the content to the area based on the wait instruction stored in the arrangement instruction management section; and
when the new instruction has the information indicating the prohibition of waiting, the storage control section is prohibited from storing the new instruction as the wait instruction in the arrangement instruction management section.

2. The display control apparatus according to claim 1, wherein:
the new display instruction is generated independent of an instruction from a user.

3. The display control apparatus according to claim 1, wherein:
the importance degree of the content of the display instruction that is based on an instruction from a user is set to be larger than the importance degree of the content of the display instruction that is independent of an instruction from a user.

4. The display control apparatus according to claim 1, wherein:
when the present content becomes a non-display state in a situation where the new instruction is stored as the wait instruction in the arrangement instruction management section, the new content is selected by the mediation section.

5. The display control apparatus according to claim 1, wherein:
when a further-new display instruction is generated in a situation where the new instruction is stored as the wait instruction in the arrangement instruction management section, the mediation section selects one of a content of the further-new display instruction, the new content of the wait instruction and the displayed present content based on the importance degrees of the further-new display instruction, the new content of the wait instruction and the displayed present content.

6. A display control apparatus for assigning contents to a plurality of areas configured as display regions on a screen of a display mounted to a vehicle and for displaying the contents, the display control apparatus comprising:
a controller, the controller is configured to
    execute, in a mediation section, mediation between a new instruction and an effective instruction based on an importance degree of the new instruction and an importance degree of the effective instruction, wherein the new instruction is an arrangement instruction to newly arrange a content to an area, wherein the effective instruction is an arrangement instruction presently adopted;
    select, in a content assignment section, an arrangement instruction providing no duplication of the contents or the areas based on the mediation between the arrangement instructions by the mediation section, and perform assignment of the contents to the areas; and
    store, by a storage control section, the new instruction as a wait instruction in an arrangement instruction management section when the new instruction is not selected,
wherein:
an arrangement instruction has information indicating permission or prohibition of waiting;
when a new instruction has the information indicating the permission of waiting, the storage control section stores the new instruction as the wait instruction in the arrangement instruction management section;
after performing the assignment based on the arrangement instruction selected by the mediation section, the content assignment section assigns the content to the area based on the wait instruction stored in the arrangement instruction management section; and
when a new instruction has the information indicating the prohibition of waiting, the storage control section is prohibited from storing the new instruction as the wait instruction in the arrangement instruction management section.

7. The display control apparatus according to claim 6, wherein:
when an arrangement instruction has an insertion importance degree other than the importance degree, the mediation section executes the mediation based on the insertion importance degree of the new instruction and the importance degree of the effective instruction.

8. The display control apparatus according to claim 6, wherein:
when the new instruction has inferior-to-superior information indicating inferiority or superiority relative to the effective instruction, the mediation section executes the mediation using the inferior-to-superior information together with the importance degrees.

9. The display control apparatus according to claim 6, wherein:
the storage control section stores the new instruction as the wait instruction in the arrangement instruction management section so that a chronological order of the new instructions is maintained.

10. The display control apparatus according to claim 6, wherein:
when the effective instruction is not selected, the storage control section stores the effective instruction as a return instruction in an arrangement instruction management section; and
after assigning the selected arrangement instruction, the content assignment section selects the return instruction providing no duplication of the contents or the areas based the return instruction stored in the arrangement instruction management section and performs the assignment of the contents to the areas.

11. The display control apparatus according to claim 10, wherein:
an arrangement instruction has information indicating permission or prohibition of returning;
when the effective instruction has the information indicating the permission of returning, the storage control section stores the effective instruction as the return instruction in the arrangement instruction management section.

12. The display control apparatus according to claim 10, wherein:
the storage control section stores the return instructions in the arrangement instruction management section so that a chronological order of the effective instructions is maintained.

13. The display control apparatus according to claim 10, wherein:
the mediation section executes the mediation between the wait instruction and the return instruction based on the importance degrees; and
based on the mediation between the arrangement instructions by the mediation section, the content assignment section selects the arrangement instruction providing no duplication of the contents or the areas and assigns the contents to the areas.

14. The display control apparatus according to claim 13, wherein:
when the arrangement instruction has an insertion importance degree other than the importance degree, the mediation section executes the mediation using the insertion importance degree.

15. The display control apparatus according to claim 13, wherein:
the mediation section executes the mediation so that a chronological order of the arrangement instructions having the insertion importance degrees is maintained.

16. A display control apparatus for assigning a content to an area configured as a display region on a screen of a display mounted to a vehicle and for displaying the content, the display control apparatus comprising:
a controller, the controller is configured to
select, in a mediation section, either one of a present content and a new content different from the present content as a display target of the area based on an importance degree of a new instruction and an importance degree of an effective instruction when the new instruction, which is a new display instruction to display the new content to the area, is generated during displaying of the present content on the area, wherein the effective display instruction is a display instruction to display the present content;
assign, in a content assignment section, the new content or the present content as the display target to the area based on a result of the selecting by the mediation section; and
store, by a storage control section, the effective instruction as a return instruction in an arrangement instruction management section when the effective instruction is not selected, wherein:
a display instruction has information indicating permission or prohibition of returning;
when the effective instruction has the information indicating the permission of returning, the storage control section stores the effective instruction as the return instruction in the arrangement instruction management section;
after assigning the display target based on a result of the selecting by the mediation section, the content assignment section selects the return instruction providing no duplication of the contents or the areas based the return instruction stored in the arrangement instruction management section and performs the assignment of the contents to the areas; and
when the effective instruction has the information indicating the prohibition of returning, the storage control section is prohibited from storing the effective instruction as the return instruction in the arrangement instruction management section.

17. A display control apparatus for assigning contents to a plurality of areas configured as display regions on a screen of a display mounted to a vehicle and for displaying the contents, the display control apparatus comprising:
a controller, the controller is configured to
execute, in a mediation section, mediation between a new instruction and an effective instruction based on an importance degree of the new instruction and an importance degree of the effective instruction, wherein the new instruction is an arrangement instruction to newly arrange a content to an area, wherein the effective instruction is an arrangement instruction presently adopted;
select, in a content assignment section, an arrangement instruction providing no duplication of the contents or the areas based on the mediation between the arrangement instructions by the mediation section, and perform assignment of the contents to the areas; and
store, by a storage control section, the effective instruction as a return instruction in an arrangement instruction management section when the effective instruction is not selected,
wherein:
an arrangement instruction has information indicating permission or prohibition of returning;
when the effective instruction has the information indicating the permission of returning, the storage control section stores the effective instruction as the return instruction in the arrangement instruction management section;
after assigning the display target based on the selected arrangement instruction, the content assignment section selects the return instruction providing no duplication of the contents or the areas based the return instruction stored in the arrangement instruction management section and performs the assignment of the contents to the areas; and
when the effective instruction has the information indicating the prohibition of returning, the storage control section is prohibited from storing the effective instruction as the return instruction in the arrangement instruction management section.

18. A display control apparatus for assigning a content to an area configured as a display region on a screen of a display mounted to a vehicle and for displaying the content, the display control apparatus comprising:
a controller, the controller is configured to
execute, in a mediation section, mediation to select either one of a present content and a new content different from the present content as a display target of the area based on an importance degree of a new instruction and an importance degree of an effective instruction when the new instruction, which is a new display instruction to display the new content to the area, is generated during displaying of the present content on the area, wherein the effective display instruction is a display instruction to display the present content; and assign, in a content assignment section, the new content or the present content as the display target to the area based on a result of the mediation executed by the mediation section, wherein:

a predetermined display instruction of the display instructions has, in addition to the importance degree, an insertion importance degree other than the importance degree;

when the new instruction has the insertion importance degree, the mediation section executes the mediation to select either one of the new instruction and the effective instruction based on the insertion importance degree of the new instruction and the importance degree of the effective instruction.

19. A display control apparatus for assigning contents to a plurality of areas configured as display regions on a screen of a display mounted to a vehicle and for displaying the contents, the display control apparatus comprising:

a controller, the controller is configured to execute, in a mediation section, mediation between a new instruction and an effective instruction based on an importance degree of the new instruction and an importance degree of the effective instruction, wherein the new instruction is an arrangement instruction to newly arrange a content to an area, wherein the effective instruction is an arrangement instruction presently adopted; and select, in a content assignment section, an arrangement instruction providing no duplication of the contents or the areas based on the mediation between the arrangement instructions by the mediation section, and perform assignment of the contents to the areas, wherein:

a predetermined arrangement instruction of the arrangement instructions has, in addition to the importance degree, an insertion importance degree other than the importance degree;

when the new instruction has the insertion importance degree, the mediation section executes the mediation based on the insertion importance degree of the new instruction and the importance degree of the effective instruction.

20. The display control apparatus according to claim 18, wherein:

when the new instruction does not have the insertion importance degree, the mediation section executes the mediation based on the importance degree of the new instruction and the importance degree of the effective instruction.

21. The display control apparatus according to claim 18, wherein:

the mediation section executes the mediation based on whether the importance degree or the insertion importance degree of the new instruction is larger than the importance degree of the effective instruction.

22. The display control apparatus according to claim 18, wherein:

when the new instruction has inferior-to-superior information indicating inferiority or superiority relative to the effective instruction, the mediation section executes the mediation using the inferior-to-superior information together with the importance degrees.

23. The display control apparatus according to claim 18, wherein:

at least part of the new instruction has inferior-to-superior information indicating inferiority or superiority relative to the effective instruction; and the mediation section executes the mediation based on the inferior-to-superior information when the importance degree or the insertion importance degree of the new instruction is equal to the importance degree of the effective instruction.

24. The display control apparatus according to claim 18, wherein:

when the new instruction has the insertion importance degree, the mediation section executes the mediation to select either one of the new instruction and the effective instruction based on whether the insertion importance degree of the new instruction is larger than the importance degree of the effective instruction;

when the new instruction does not have the insertion importance degree, the mediation section executes the mediation to select either one of the new instruction and the effective instruction based on whether the importance degree of the new instruction is larger than the importance degree of the effective instruction;

a first display instruction is the display instruction that does not have the insertion importance degree but has the importance degree;

a second display instruction is the display instruction that has the importance degree smaller than the importance degree of the first display instruction and that has the insertion importance degree larger than the importance degree of the first display instruction;

when the second display instruction is generated as the new instruction in a situation where the first display instruction acts as the effective instruction, the mediation section selects the second display instruction as an effective instruction on a basis that the insertion importance degree of the second display instruction is larger than the importance degree of the first display instruction; and when the first display instruction is generated as the new instruction in a situation where the second display instruction acts as the effective instruction, the mediation section selects the first display instruction as an effective instruction on a basis that the importance degree of the second display instruction is smaller than the importance degree of the first display instruction.

25. The display control apparatus according to claim 19, wherein:

when the new instruction does not have the insertion importance degree, the mediation section executes the mediation based on the importance degree of the new instruction and the importance degree of the effective instruction.

26. The display control apparatus according to claim 19, wherein:

the mediation section executes the mediation based on whether the importance degree or the insertion importance degree of the new instruction is larger than the importance degree of the effective instruction.

27. The display control apparatus according to claim 19, wherein:

when the new instruction has inferior-to-superior information indicating inferiority or superiority relative to the effective instruction, the mediation section executes the mediation using the inferior-to-superior information together with the importance degrees.

28. The display control apparatus according to claim 19, wherein:
   at least part of the new instruction has inferior-to-superior information indicating inferiority or superiority relative to the effective instruction; and
   the mediation section executes the mediation based on the inferior-to-superior information when the importance degree or the insertion importance degree of the new instruction is equal to the importance degree of the effective instruction.

29. The display control apparatus according to claim 19, wherein:
   when the new instruction has the insertion importance degree, the mediation section executes the mediation to give priority to either one of the new instruction and the effective instruction based on whether the insertion importance degree of the new instruction is larger than the importance degree of the effective instruction;
   when the new instruction does not have the insertion importance degree, the mediation section executes the mediation to give priority to either one of the new instruction and the effective instruction based on whether the importance degree of the new instruction is larger than the importance degree of the effective instruction;
   a first arrangement instruction is the arrangement instruction that does not have the insertion importance degree but has the importance degree;
   a second arrangement instruction is the arrangement instruction that has the importance degree smaller than the importance degree of the first arrangement instruction and that has the insertion importance degree larger than the importance degree of the first arrangement instruction;
   when the second arrangement instruction is generated as the new instruction in a situation where the first arrangement instruction acts as the effective instruction, the mediation section executes the mediation to give priority to the second arrangement instruction as an effective instruction on a basis that the insertion importance degree of the second arrangement instruction is larger than the importance degree of the first arrangement instruction; and
   when the first arrangement instruction is generated as the new instruction in a situation where the second arrangement instruction acts as the effective instruction, the mediation section executes the mediation to give priority to the first arrangement instruction as an effective instruction on a basis that the importance degree of the second arrangement instruction is smaller than the importance degree of the first arrangement instruction.

\* \* \* \* \*